United States Patent
Johns et al.

(10) Patent No.: US 12,026,214 B2
(45) Date of Patent: Jul. 2, 2024

(54) LOCATION BASED PUSH NOTIFICATION AND MULTI-USER CLASS SOCIAL INTRODUCTION

(71) Applicant: Developing Software LLC, Vancouver, WA (US)

(72) Inventors: Troy Johns, Vancouver, WA (US); Steven D. Corey, Vancouver, WA (US)

(73) Assignee: Developing Software LLC, Vancouver, WA (US)

( * ) Notice: Subject to any disclaimer, the term of this patent is extended or adjusted under 35 U.S.C. 154(b) by 794 days.

(21) Appl. No.: 15/668,608

(22) Filed: Aug. 3, 2017

(65) Prior Publication Data

US 2017/0329790 A1 Nov. 16, 2017

Related U.S. Application Data

(63) Continuation-in-part of application No. 15/277,818, filed on Sep. 27, 2016, now abandoned.
(Continued)

(51) Int. Cl.
*G06F 16/9537* (2019.01)
*G06F 3/0482* (2013.01)
(Continued)

(52) U.S. Cl.
CPC ........ *G06F 16/9537* (2019.01); *G06F 3/0482* (2013.01); *G06F 3/0488* (2013.01);
(Continued)

(58) Field of Classification Search
USPC ....................................................... 705/313
See application file for complete search history.

(56) References Cited

U.S. PATENT DOCUMENTS

| 9,978,109 B1 * | 5/2018 | Catalano ................ G06Q 50/16 |
| 2002/0138485 A1 | 9/2002 | Faudman |

(Continued)

FOREIGN PATENT DOCUMENTS

| AU | 2014280986 A1 * | 7/2015 | ....... G06Q 10/06311 |
| JP | 6949031 B2 | 9/2021 | |

(Continued)

OTHER PUBLICATIONS

Sarwar, Badrul, et al. "Analysis of recommendation algorithms for e-commerce." Proceedings of the 2nd ACM Conference on Electronic Commerce. 2000. (Year: 2000).*

(Continued)

*Primary Examiner* — Michael Young
(74) *Attorney, Agent, or Firm* — Perkins Coie LLP; Colin Fowler

(57) ABSTRACT

Certain aspects of the technology disclosed herein involve managing a connection between users of a first profile class and users of a second profile class based on proximity. Location data from a first mobile device is used to determine that a first user of a first class is within a first proximity of a property. The property has at least one parameter identified in a user profile of the first user of the first class. Location data from a second mobile device is used to determine that a second user of a second class is within a second proximity of the property. A notification is transmitted to the first mobile device identifying the property, and at least the second user of the second class. A message is received from the first mobile device indicating selection of the second user. The first mobile device connects with the second mobile device.

21 Claims, 19 Drawing Sheets

Related U.S. Application Data

(60) Provisional application No. 62/233,953, filed on Sep. 28, 2015.

(51) Int. Cl.
| | | |
|---|---|---|
| *G06F 3/0488* | (2022.01) | |
| *G06Q 50/16* | (2012.01) | |
| *H04L 67/01* | (2022.01) | |
| *H04L 67/306* | (2022.01) | |
| *H04W 4/02* | (2018.01) | |
| *G06F 3/04886* | (2022.01) | |

(52) U.S. Cl.
CPC ............ *G06Q 50/16* (2013.01); *H04L 67/01* (2022.05); *H04L 67/306* (2013.01); *H04W 4/023* (2013.01); *H04W 4/026* (2013.01); *G06F 3/04886* (2013.01)

(56) References Cited

U.S. PATENT DOCUMENTS

| | | | | |
|---|---|---|---|---|
| 2005/0144279 A1* | 6/2005 | Wexelblat | ............ | G06Q 30/06 709/225 |
| 2006/0241963 A1* | 10/2006 | Walker | .................. | G06Q 30/02 705/313 |
| 2011/0055247 A1 | 3/2011 | Blumberg et al. | | |
| 2011/0078138 A1* | 3/2011 | Cardella | ............. | G06F 16/903 707/723 |
| 2011/0184873 A1 | 7/2011 | Wilson et al. | | |
| 2011/0301987 A1* | 12/2011 | Wiese | .................. | G06Q 50/16 705/7.11 |
| 2013/0304657 A1 | 11/2013 | Miller et al. | | |
| 2014/0026094 A1 | 1/2014 | Zimmerman et al. | | |
| 2014/0122299 A1 | 5/2014 | Klein et al. | | |
| 2015/0235332 A1* | 8/2015 | Styve | ............... | G06Q 10/06311 705/7.13 |
| 2016/0275762 A1* | 9/2016 | Kuenzi | .................. | G08B 13/02 |
| 2017/0024836 A1* | 1/2017 | Jackson | .................. | H04L 67/18 |
| 2017/0091884 A1 | 3/2017 | John | | |

FOREIGN PATENT DOCUMENTS

| | | |
|---|---|---|
| JP | 2021128789 | 9/2021 |
| RU | 2008146867 A | 6/2010 |
| RU | 2451996 C2 | 5/2012 |
| RU | 2549135 C2 | 4/2015 |

OTHER PUBLICATIONS

International Search Report and Written Opinion PCT/US2016/054167 dated Jan. 19, 2017, pp. 1-10.

Hagey, Paul, Uber-like mobile app Curb Call connects homebuyers with nearby agents, Realty One Group one of four brokerage launch partners, Inman Connect website, [retrieved on Apr. 10, 2017], Retrieved from <<http://www.inman.com/2014/05/21/uber-like-mobile-app-curb-call-connects-buyers-with-nearby-agents/>>, May 21, 2017, pp. 1-7.

MRIS LLC, a Bright MLS, Inc. Company ("MRIS") Website, MRIS to Launch First of its Kind GPS-Based Mobile App For Real Estate Professional,s, [retrieved on Apr. 10, 2017], Retrieved from: <<http://www.mris.com/about-mris/news/mris-to-launch-first-of-its-kind-gps-based-mobile-app-for-real-estate-professionals>>, Jul. 30, 2012, 3 pp.

Smarter Agent Mobile, website, [online], [retrieved on Apr. 10, 2017], Retrieved from: <<http://www.smarteragent.com>>, Jun. 5, 2011, 3 pp.

Russian Federation Search Report dated Mar. 4, 2020, for Russian Application No. 2018116003, 2 pages.

\* cited by examiner

LOCATION BASED PUSH NOTIFICATION AND MULTI-USER CLASS SOCIAL INTRODUCTION

CROSS-REFERENCE TO RELATED APPLICATIONS

This application is a continuation-in-part application of U.S. patent application Ser. No. 15/277,818, filed Sep. 27, 2016, which claims priority to U.S. Provisional Patent Application Ser. No. 62/233,953, filed Sep. 28, 2015, both of which are incorporated herein by reference in their entirety.

TECHNICAL FIELD

The present application relates generally to immediate proximity based content sharing, and more particularly, to connecting users of a first profile class to users of a second profile class based on user proximity.

BACKGROUND

Conventionally, a real-estate agent can wait to be contacted by clients interested in a selection of properties that the real-estate agent knows about. This process requires the client to identify properties remotely (e.g., via a remote computer at a real estate office), away from properties of interest. Contact with a realtor can be facilitated by a call or a walk-in meeting and not targeted to any particular property or properties.

SUMMARY

Certain aspects of the technology disclosed herein involve an application server managing a connection between users of a first profile class and users of a second profile class based on proximity. The application server determines, based on location data from a first mobile device, that a first user of a first class is within a first predetermined proximity of a for-sale property. The for-sale property can have at least one parameter identified in a user profile of the first user of the first class. The application server determines, based on location data from a second mobile device, that a second user of a second class is within a second predetermined proximity of the for-sale property. The application server transmits a notification to the first mobile device identifying that for-sale property, and at least the second user of the second class. The application server receives a message from the first mobile device indicating selection of the second user of the second class. The application server facilitates a connection between the first mobile device and the second mobile device.

Certain aspects of the technology disclosed herein involve a mobile application managing a connection between users of a first profile class and users of a second profile class based on proximity. A mobile application running on a first mobile device identifies a plurality of properties having a known location within a distance of a determined location of a first mobile device. The first mobile device is associated with a user of a first class. The mobile application selects a property among the plurality of properties. The selected property is associated with a position of the first mobile device. The mobile application generates a list of second users associated with the selected property for display on the first mobile device. The second users in the list of second users are identified as available to show the selected property based on a current status. The mobile application selects a second user among the list of second users based on either of an input by the first user or automatic selection of a closest second user. The mobile application connects the first mobile device to a second mobile device of the selected second user by a communication function of the mobile application or by directing communication through a default communication application on the first mobile device.

DETAILED DESCRIPTION

Figure 1:
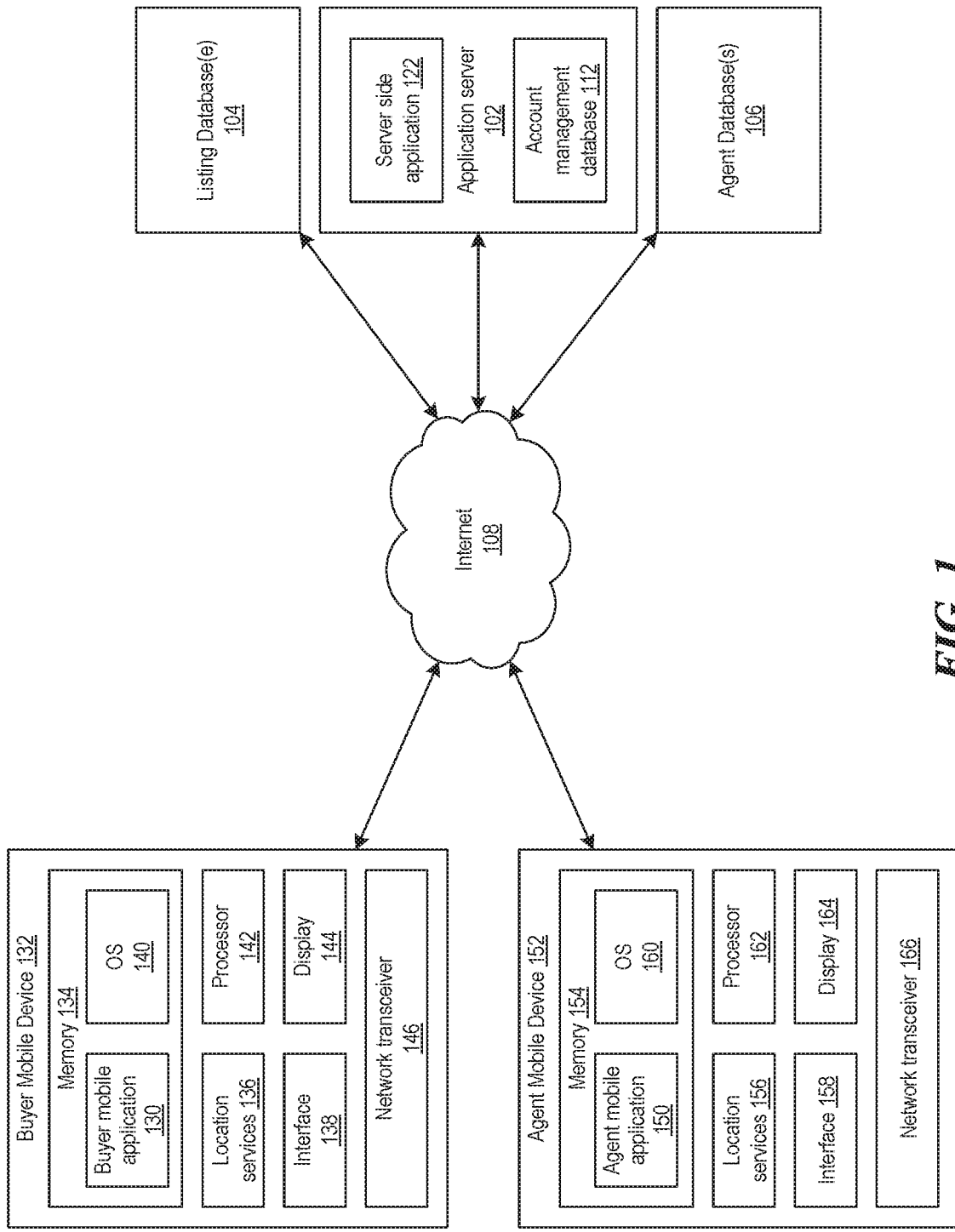
FIG. 1 is a block diagram of an immediate proximity property shopping network, according to various embodiments.

Certain aspects of the technology disclosed herein involve connecting a first class of users (such as property buyers or renters) to a second class of users (real estate agents) based on the proximity both users to particular, for-sale real property.

A client may travel to a location to assess one or more properties. At some point the client passes by a for-sale/for-rent property (references to for-sale property may also be interpreted as for-rent where logically sensible) that piques the client's interest. The client accesses a mobile application on a mobile device. The mobile application uses an on-board location detection service to locate the client, and cross-references location data with property listing data to identify a property within a proximity of the client.

The mobile application can identify one or more real-estate agents associated with properties within the proximity of the client and generate a list of real-estate agents. For example, agents registered with a property and/or nearby a property can be associated with the property. The list of real-estate agents can include additional information including, for example, customer ratings, reviews, sales history, etc. The client can be provided with the list of real estate agents. The client uses the mobile application to contact one or more of the real estate agents to coordinate a showing of the property immediately proximate to the client in the immediate future. Utilizing a location-based system to coordinate interactions between clients and real-estate agents may draw real-estate agents to locations near available houses, and enable clients to more readily tour available properties.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

FIG. 1 is a block diagram of an immediate proximity property shopping network, according to various embodiments. The service utilizes separate mobile devices (e.g., buyer mobile device 132 and agent mobile device 152) operated by a client and a real-estate agent ("agent"). The buyer mobile device 132 and the agent mobile device 152 include a processor (e.g., processor 142 and processor 162) to execute instructions of a proximity based mobile application (e.g., mobile buyer application 130 and agent mobile application 150). The devices include a user interface (e.g., interface 138 and interface 158), along with a memory (e.g., memory 134 and memory 154) with an instantiated operating system (e.g., OS 140 and OS 160) and application software (e.g., mobile buyer application 130 and agent mobile application 150). In some embodiments, the application software comprises two separate versions, one for clients (e.g., mobile buyer application 130) and one for agents (e.g., agent mobile application 150). In other embodiments, there is a single version of the application software and graphical elements generated by executing the application vary based on login credentials. For example, a user associated with a client is provided different graphical elements on a touchscreen display than a user associated with an agent. The login credentials indicate whether the user is a client or an agent based on an assessment performed at account creation.

In some embodiments, the owner or builder of the selected property represents the "agent" side of the application. In the case of new construction, a builder is allowed to show a property. An owner is also able to show their own property. In these embodiments, the real estate agent may merely be a "real estate professional." The disclosed application includes profile features for "agent side" profiles to indicate that the given user may only show select property and accordingly show up as a customer selectable option in searches for the select properties. The interface for customer users further indicates that the given "agent user" is not actually a real estate agent, but either the owner or builder of the property.

Each device further includes a network transceiver (e.g., network transceiver 146 and network transceiver 166) for connecting to one or more networks, such as, for example, a cellular network, the Internet 108, a virtual private network, etc. Each mobile device is configured to detect its own location via a location services device (e.g., location services 136 and location services 156). To location detect, one or more of a global positioning system (GPS), cellular tower triangulation, internet protocol (IP) address location, or other location determination services is utilized to determine a location of the mobile device. In an embodiment, the mobile device can be connected to another device (e.g., a vehicle, and one or more location services devices of a device to which the mobile device is connected can be utilized to determine a location (e.g., GPS, compass, etc. of a vehicle). In an embodiment, a location services device of a mobile device can be used in combination with a mobile services device of a connected device. For example, GPS of a mobile phone can be used in combination with a compass of a car such that a location of a user can be determined based on the GPS and a direction of a user (e.g., a direction of travel and/or a direction a user is facing) can be determined based on a compass of the car to which the mobile device is connected.

The application software is configured to reference one or more databases of property listings (e.g., listing databases 104). The one or more databases of property listings can include, for example, the Multiple Listing Service (MLS), another listing service, or any combination of listing services. The one or more databases can use a standardized data format, such as, for example, the Real Estate Transaction Standard (RETS). The application software accesses each database either as an exterior browser or as an integrated searcher. As an integrated searcher, the application software directly searches database records of available for-sale/for-rent properties in a tight area around either the client or the agent.

The size of the "tight area" varies by class of user. The area searched by an agent application can be larger than that of the client application. For example, a client application can search for properties within 1 mile of the location of the user, and an agent application can search within 30 miles. In other embodiments, a client tight-area can comprise 100 feet, whereas an agent tight-area would be 15 miles.

The tight area can be directionally based, meaning that properties in a particular direction can be searched. For example, a motion sensor (e.g., gyroscope, compass, etc.) integrated into a mobile device can be used to predict a direction a user is facing and provide properties in a direction associated with the user's predicted orientation. In another example, a motion sensor integrated into another device (e.g., a vehicle) can be used to predict an orientation of a user and provide properties in a direction associated with the user's predicted orientation. Further description of providing properties in a tight area based on a direction of a user are provided below with reference to FIG. 6A.

The practice of setting up searches in these sizes of areas is directed towards the function of the application where a client is seeking listings for property the client is immediately located at, and seeking an agent who is presently close by. The practice of tailoring a tight area based on a predicted direction of a user is to, for example, enable a user to hold a mobile device in a direction of a property of interest and promptly determine what agents are available for the property.

In the alternative of directly querying a database of listing records, some embodiments of the application software are configured to scrape or crawl results from commercial listing services such as Zillow®, Trulia®, individual listing agent pages, or other suitable commercial services known in the art. Accordingly, the application software is configured to access the commercial service web page, query based on the tight area as relevant to the searching user, scrape the results from the list and further filter the results to the relevant tight area (as it is unlikely the commercial service provides area searching to specification), then subsequently use the results as internally relevant in the application software.

In some cases, the commercial service website presents results as nodes on a map rather than in a textual list format. Accordingly, the application software scrapes the data from the underlying page code concerning each of the "nodes." In order to acquire the relevant data, the map with nodes from the commercial service may not actually be displayed on the client's or agent's mobile device. The relevant code for the page display is still parsed for search results.

The mobile devices (e.g., buyer mobile device 132 and agent mobile device 152), through the application software, additionally communicate with one or more agent databases 106 on an application server 102. The application server 102 includes server side components of the application software 122 as well as one or more account management database(s) 112. Account management database(s) 112 contain data concerning login credentials as necessary as well as classification of accounts between client and agent. The agent database(s) 106 contain customer reviews of agents registered with the application software. In some embodiments, each of the databases mentioned can exist on a single server, or multiple servers.

Figure 2:
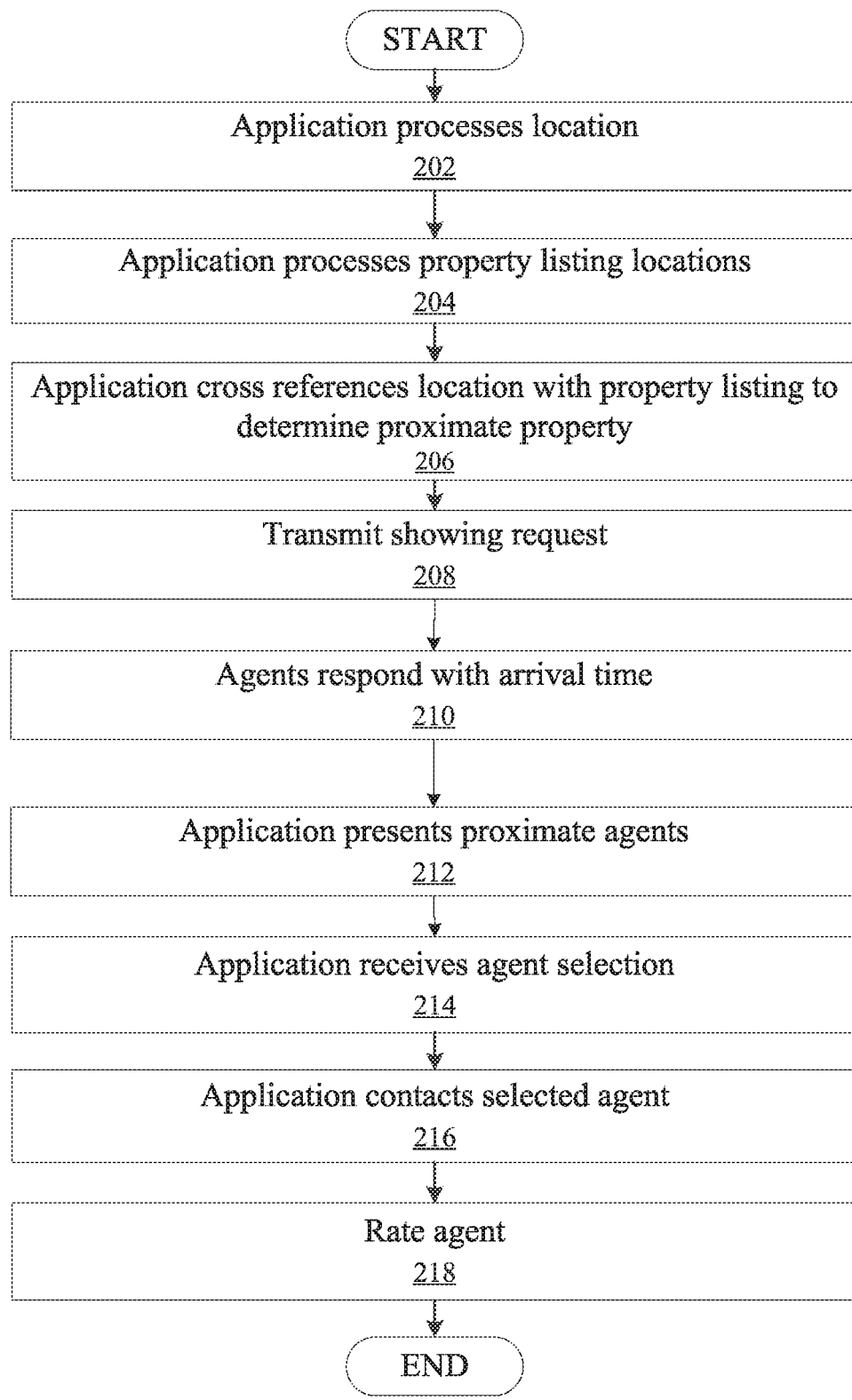
FIG. 2 is a flow chart of an immediate proximity property shopping application action, according to various embodiments.

FIG. 2 is a flow chart of a method performed by executing an immediate proximity property shopping application (e.g., buyer mobile application 130), according to various embodiments. When a client engages the application software, the application determines the location of the client (step 202). Then the application determines the available property within a tight-area (step 204). Once the location and the tight area for-sale property is determined, this data is cross referenced to determine which property the client is in proximity with (e.g., standing immediately next to or in front of) (step 206).

In order to determine the for-sale property the client is immediately next to, several calculations are made depending on the results of the cross reference. In an embodiment, the mobile application can identify and select the for-sale property and provide a list of agents available for the for-sale property. For example, if there is only one for-sale property in the tight area, the mobile application can select the only for-sale property. Alternatively, the tight area filtering is performed in progressively tighter iterations until there is only a single, selected property. In another alternative, the closest for-sale property to the location of the client's mobile device becomes the selected property. In another alternative, the for-sale property in which the client is determined to be facing (e.g., by using a compass in a mobile device) is selected.

In the case where the location services are not suitably accurate, the filtering can apply additional factors in order to reach a single entry. Such factors include property based preferences which are applied to the client's application account profile. Such preference include any of location, price point, property size, property features (rooms/bathrooms/pool/etc.), or other suitable preferences. Alternatively, if the client is within a large subdivision where a plurality of properties are for sale the application can select the subdivision as a whole and log an approximate address of the client for use in later steps. In some embodiments, a combination of some or all of the filtering methods above are used to determine the relevant selected property.

In another embodiment, the mobile application can identify a plurality of for-sale properties and generate elements on a graphical user interface of a touchscreen device configured to receive inputs from a user for selecting a for-sale property among the plurality of for-sale properties. The application can display results of the cross reference and allow the user to select one of the for sale properties as the chosen property by house number, photo, map, distance away, or orientation of the mobile device. For example, a plurality of for-sale properties can be displayed in a map and the user can turn the mobile device such that the top of the mobile device points toward a for-sale property among the plurality of for-sale properties, and the application will determine that the for-sale property to which the mobile device is pointed is selected by the user.

Once a property is determined, the application sends a showing request out to agents able to show the property (step 208). Agents responding as available for showing the selected property will be assigned a current status of available. The requested showing notice allows for available agents to respond affirmatively, along with their arrival estimate. The showing request tells the agent the estimated driving time from their location to the showing, and each agent can provide their own estimate of arrival time (either as an absolute time or interval from the present time). For example, if the agent has a meeting for another 10 minutes, they can add in that 10 minutes to get to an actual estimated arrival time (or ask the app to do it for them). As a result, when the user views the list of agents, it includes an arrival time that has already had agent input, and is thus more reliable (Step 210).

The application running on the client device provides the client with a ranked list of agents who responded as available with an estimated time (absolute or interval) of the showing (step 212). The order the list of agents is presented in is based on rank. The rank is based on the estimated arrival time for the agent, personal user parameters for agents, and the agent's customer/client ratings. Personal user parameters are preferences selected by the user that help guide agent rankings for that particular user. For example, in some embodiments, agents that the individual client has met before through the application, and rated favorably are ranked higher on the ranked list of agents. Other examples of personal user parameters are languages spoken by the agent, or the brokerage the particular agent works with. In some cases, additional information such as agent biographies, a link to a credentialing agency, and estimated time until the agent is able to show the selected property, and a link to the agent's web site is displayed.

In some embodiments, the application may tune the priority of each of the personal user parameters, arrival time, and agent rating in order to determine a custom rank for a given user. The tuning of each of these elements may be determined based on user selection, analytics concerning how users as a population or the user as an individual uses the application, or other suitable methods known in the art to value ranking elements.

The application provides the estimated time of arrival for each responding agent to the client. The client can accept or move on to another agent. In some embodiments, the client is provided both an estimated time of arrival and a predicted time of arrival if the agent left their current location immediately. Thus, if the estimated arrival time is substantially greater than the predicted arrival time, a client can elect to move on to another agent. In some embodiments, the client agrees that if a selected agent shows the property to that client, the client will use that agent.

The client then selects one of the agents to contact and the application facilitates a communicative connection between the client and the selected agent (step 214). The application contacts the selected agent via a default, in-band communication method or an out-of-band communication method selected by the user (step 214). In-band communication refers to communication that is conducted within the application and handled predominantly by the application server. Out-of-band communication refers to communication that is conducted with aid of an external application such as an SMS messaging application or a phone call application. In the case of out-of-band communication, the applications server may still facilitate the communication by masking the contact information of the devices of the client and the agent. Later, the client is enabled to rate the agent using the application, and the rating is stored in the agent database(s) (step 218). The rating received from the client can be used to update an overall rating for the agent. Similarly, agents can rate clients as well and comment that a particular client abandoned the agent. Ratings for clients are stored in a client database which can be part of the application server 102 or another server. The rating received from the agent can be used to update an overall rating for the client.

Figure 3:
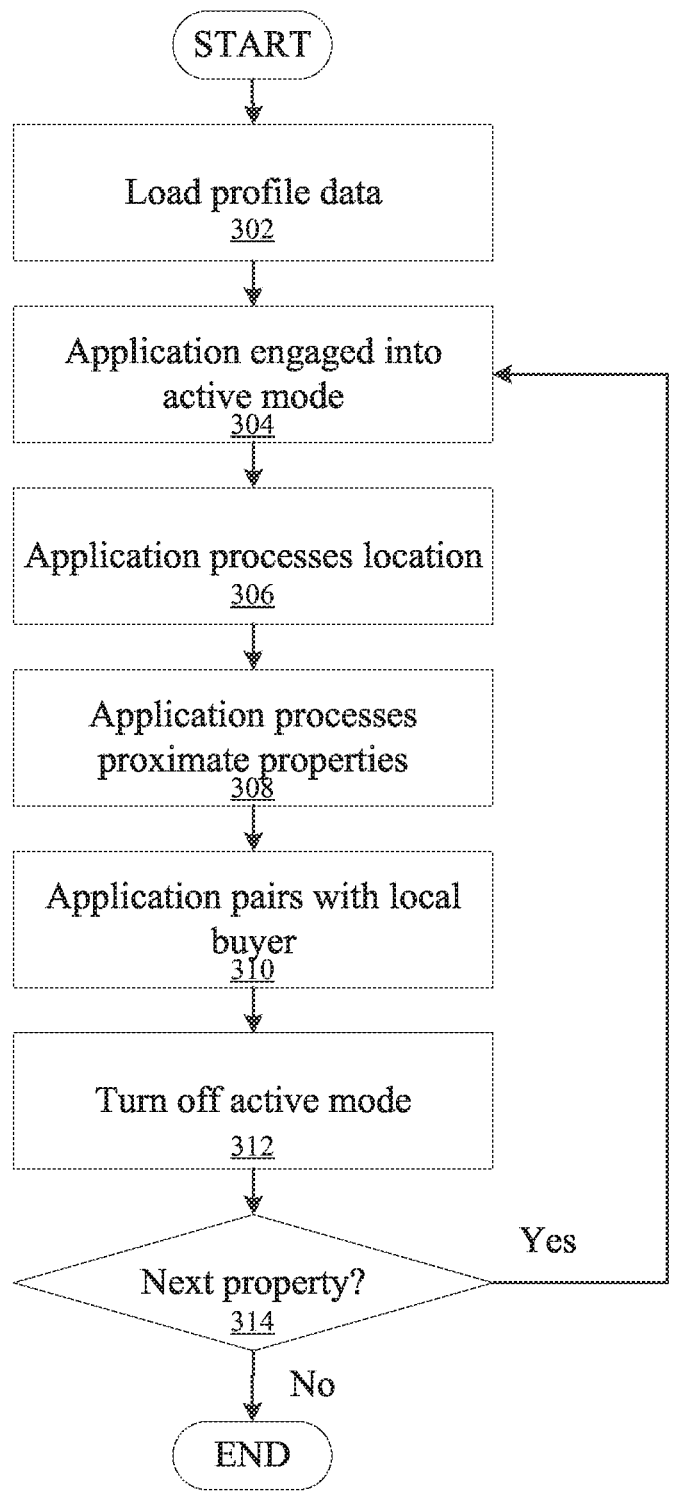
FIG. 3 is a flow chart of an agent pairing application action, according to various embodiments.

FIG. 3 is a flow chart of an agent pairing application action, according to various embodiments. When an agent activates the application, previously entered profile data is loaded (step 302). This profile data includes, for example, data relating to the agent's name, picture, ratings from clients, comments from clients, covered territory, properties the agent has access to show, and properties previously sold by the agent.

The profile data can also include historic location data associated with the agent, such as, for example, locations a mobile device associated with the agent is detected in excess of a threshold time period and/or locations the mobile device associated with the agent is detected a number of times in excess of a threshold number of times. A threshold time period can range from minutes to hours and include a default threshold time period and/or a configurable threshold time period. A threshold number of times can be 2 or more and include a default threshold number of times (e.g., set at 3 times) and/or a configurable threshold number of times (e.g., an agent can change the threshold from a default 3 times to a 5 times). The application can use historic location data to predict a location of an agent, for example, in the event of a failure of location services (e.g., GPS failure) or to bolster accuracy of location services. For example, if an agent is detected at a for-sale property 4 times in the last week and GPS determines the agent is approximately within a 200 foot radius of the for-sale property, the application can determine that the agent is located at the for-sale property.

The agent then engages "active mode" wherein application software indicates to the application server that this particular agent is free and would like to receive property showing requests (step 304). The application continually maintains the location of the agent. In some embodiments, each agent's device reports the agent's location to the application server at certain time intervals or in response to a minimum distance traveled since last update. The application server then knows roughly which agents to poll for location when generating a list of agents for a client device.

The application pairs the agent profile with local client profiles by determining a location of a mobile device associated with the agent profile and identifying a for-sale property search within a proximity of the mobile device associated with the agent (step 310). The application uses the location data to determine proximate for-sale properties using agent tight area filtering. The searching for for-sale properties proceeds similarly to the client application; however, once the application obtains the list of for-sale properties in the agent's tight area, the agent may show up on any client search that selects a property within the agent's tight area filter. In some embodiments, the agent must indicate a willingness to show any of the properties within the agent's tight area within a predetermined period of time (e.g., 5 minutes). This predetermined period of time is adjustable in the agent's profile data. Accordingly, the agent's tight area (e.g., 2 mile radius) is also adjustable in the agent's profile data. In an embodiment, the application can adjust the predetermined period of time based on the selected tight area selected by the agent. For example, a predetermined period of time can be assigned based on an estimated travel time.

When a client selects the given agent and arranges a showing of the selected property for that client, the agent application switches active mode off. The agent then goes and shows the property to the client. The application can receive an input from the agent indicating that the showing has terminated and switch active mode back on. Switching back to active mode will make the agent available in generated lists for agents for client devices.

In some embodiments, active mode is never switched off and the agent is enabled to arrange more showings back to back. Where multiple agents work together, agent application can be joined such that where active mode is switched off on one agent, the group as a whole remains active.

Figure 4:
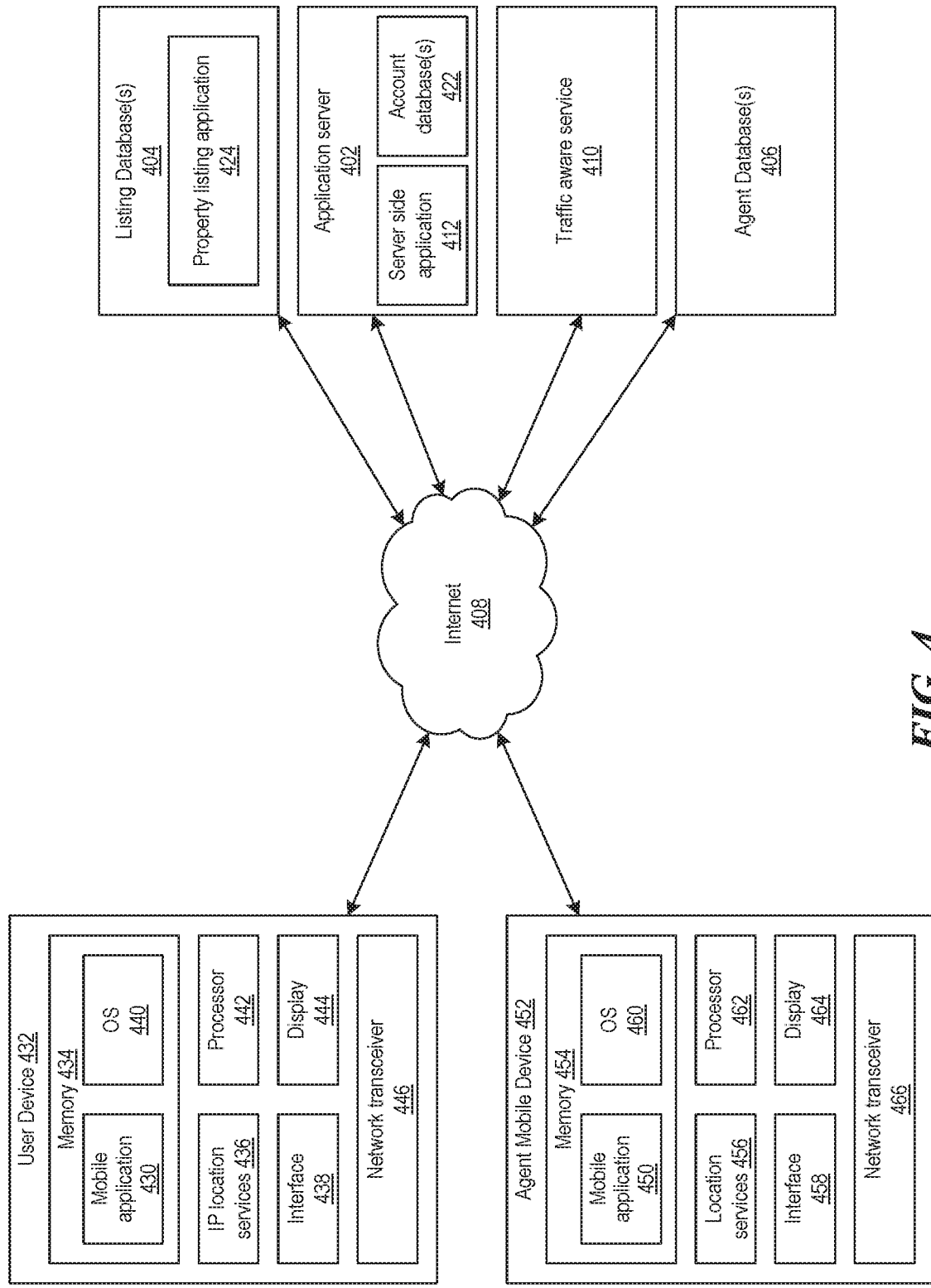
FIG. 4 is a block diagram of an immediate proximity property shopping network, according to various embodiments.

FIG. 4 is a block diagram of an immediate proximity property shopping system, according to various embodiments. Displayed is a similar system to that of FIG. 1 with select differences. The immediate proximity property shopping system can include application server 402 (e.g., application server 102), one or more listing database(s) 404 (e.g., listing database 104), one or more agent database(s) 406 (e.g., agent database 106), and traffic aware service 410. The application server 402 includes a server side application 412 and an account database 422. The listing database(s) 404 include a property listing application 424. The server side devices (e.g., the application server 402) are configured to communicate with a user device 432 and an agent mobile device 452.

The user device 432 communicates with server side devices (e.g., application server 402) via a network transceiver 446. A processor 442 of the user device 432 is configured to execute a mobile application 430 stored in memory 434. The mobile application 430 can run on a local operating system 440. The user device 432 includes IP location service 436 to determine a location of the user device 436 (e.g., via GPS). A display 444 (e.g., a touchscreen display) provides visual information to a user (e.g., the client) of the user device 432, and an interface 438 receives inputs from the user.

The agent mobile device 452 communicates with server side devices (e.g., application server 402) via a network transceiver 466. A processor 462 of the user device 452 is configured to execute a mobile application 450 stored in memory 454. The mobile application 450 can run on a local operating system 450 of the agent mobile device 452. The agent mobile device 452 includes IP location service 456 to determine a location of the user device 456 (e.g., via GPS). A display 464 (e.g., a touchscreen display) provides visual information to a user (e.g., the agent) of the agent mobile device 452, and an interface 458 receives inputs from the user.

A client operating the user device 432 (e.g., a desktop computer, laptop computer, mobile device, etc) can view for-sale properties in an external website and be routed to the mobile application 430. In some embodiments, a plugin button exists on external commercial property listing service web sites accessed via the internet 408. The plugin button enables the user device 432 to transition from the commercial property listing service web site to the mobile application 430 so the client can request an immediate showing of a for-sale property. In another embodiment, the user can select a link in an external commercial property listing service web site and be directed to a web page managed by the immediate proximity property shopping system. Variations of the method are described in FIG. 5.

Figure 5:
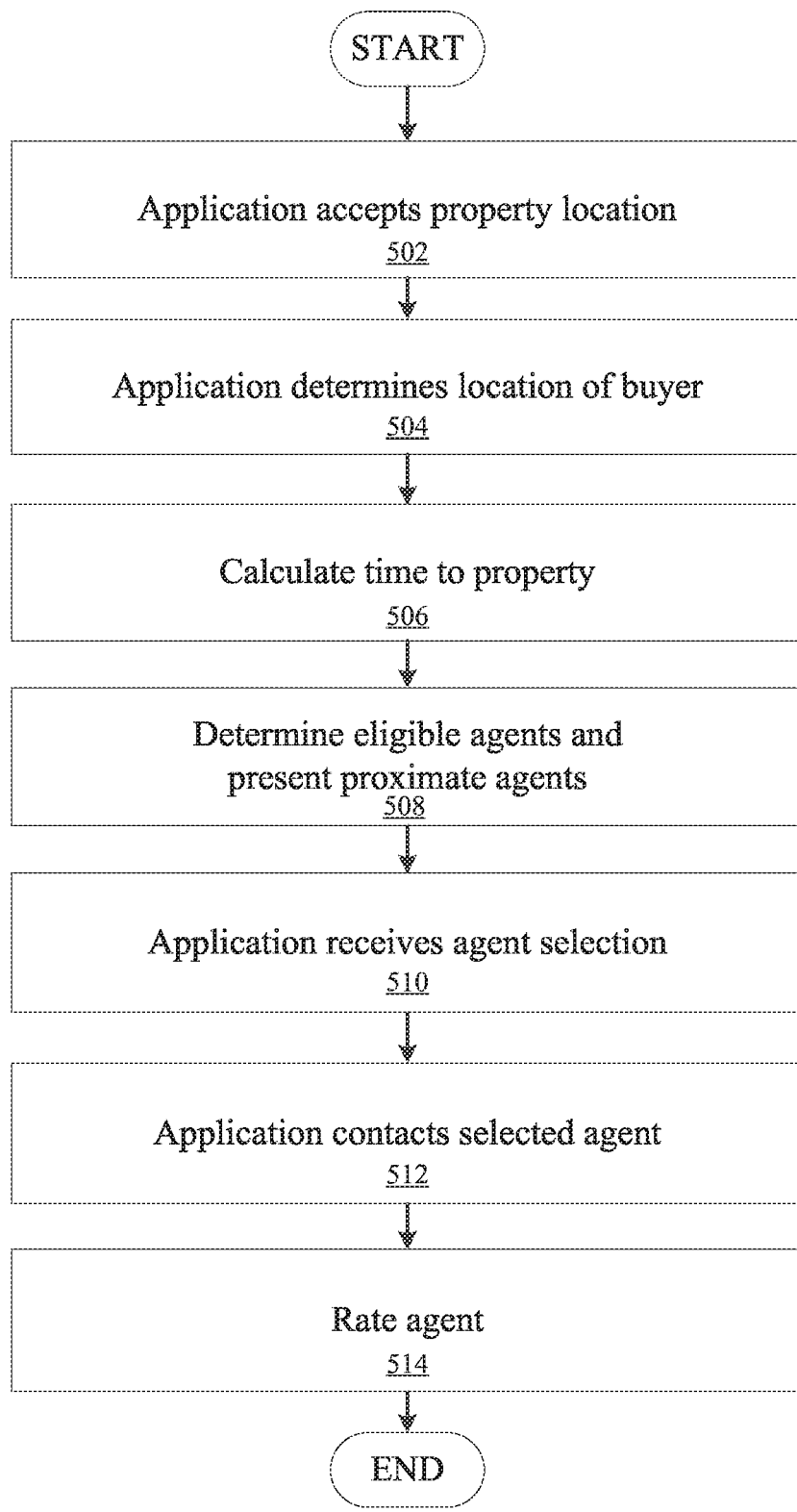
FIG. 5 is a flow chart of an immediate proximity property shopping application action, according to various embodiments.

FIG. 5 is a flow chart of an immediate proximity property showing application (hereinafter "showing application") action, according to various embodiments. A client selects a property which is passed into the showing application (e.g., server side application 412) from the property listing application 424. The property listing application 424 is configured to retrieve listing data from external commercial property listing service web sites to update the listing database 404. The showing application accepts the for-sale property from the property listing application 424 (step 502).

The showing application determines the location of the user (e.g., based on data retrieved from the IP location service 436) (step 504). The location can be determined by address entry into the application by the client, or by any of the location detection techniques disclosed above. After the location is determined, the showing application can use a traffic service (e.g., the traffic aware service 410) as well as user timing preferences to calculate the estimated amount of time required for the client to arrive at the selected property (e.g., by driving, walking, biking, public transit, etc.). Using the calculated time, the showing application can determine which agents in active mode are able to reach the selected property and show that property within the calculated time (step 506). In this manner, a proximity to the property determination is made where the proximity of one user class (agents) is dependent on the other user class (clients). The client's proximity to the property, and estimated time of arrival, is used in determining the range in which potential agents may be selected for purposes of generating a ranked list of agents.

The calculated time and/or travel distance can also be used to determine which agents will have a status of available for a particular property. A traffic service can be used to estimate an arrival time of one or more agents based on a location of one or more agent mobile devices (e.g., the agent mobile device 452) and traffic data from the traffic aware service 410 (step 508). Agents having an arrival time within a predetermined time period (e.g., plus or minus five minutes) of the client are then displayed to the client (e.g., as shown in FIG. 6B).

Availability of an agent (or plurality of agents) is determined by transmitting a message to a device (or plurality of devices) associated with the agent (or plurality of agents). The message can query an agent application on the agent device to determine a current status (e.g., available or unavailable) indicated in the agent application as well as the time required for the agent to arrive (if different than predicted by local traffic data). The message can cause the agent application to generate a prompt on the agent device that can provide information regarding a showing request (e.g., location of property, time of showing, etc.) and request information from the agent (e.g., a button to accept showing and another button to reject showing).

Agents determined to be available can be compiled into a ranked list of agents. The list of agents can be determined by the showing application or transmitted to the showing application (e.g., from the application server). The showing application can display the list of agents on the user device. The ranking is based on best fit characteristics, individual ratings for each agent as well as a confluence of the time the client indicated they wanted to be shown the property, and the time each agent indicated they would be available to show the property.

The showing application can receive an input from a user selecting an agent among a plurality of eligible agents or automatically select an eligible agent. The showing application can receive a selection from a user by, for example, detecting a user in contact (or near contact) with a region of a touchscreen associated with selecting an agent. For example, a contact with a virtual button stating "Request Agent" adjacent to an agent among a plurality of eligible agents. In another embodiment, the showing application can automatically select an agent, such as, for example, a closest eligible agent or highest rated eligible agent. The showing application can provide one or more settings to enable a user to elect an automatic selection method (e.g., closest or highest rated agent). The automatic selection method can enable the showing application to receive agent selection more quickly than can be possible with manual user selection.

The application contacts the selected agent via a default communication method or a communication method selected by the user (step 512). The agent then indicates how quickly they can show the property to the client. If an estimated time of arrival for the agent was previously provided, an updated estimation can be provided to the client. The client can accept or move on to another agent. For example, if the updated arrival time is substantially greater than the estimated arrival time, a client can elect to move on to another agent. In some embodiments, the client agrees that if a selected agent shows the property to that client, the client will use that agent.

Later, the client is enabled to rate the agent using the application, and the rating is stored in the agent database(s) (step 514). The rating received from the client can be used to update an overall rating for the agent. Similarly, agents can rate clients as well and comment that a particular client abandoned the agent. Ratings for clients are stored in a client database which can be part of the application server 402 or another server. The rating received from the agent can be used to update an overall rating for the client.

Figure 6A:
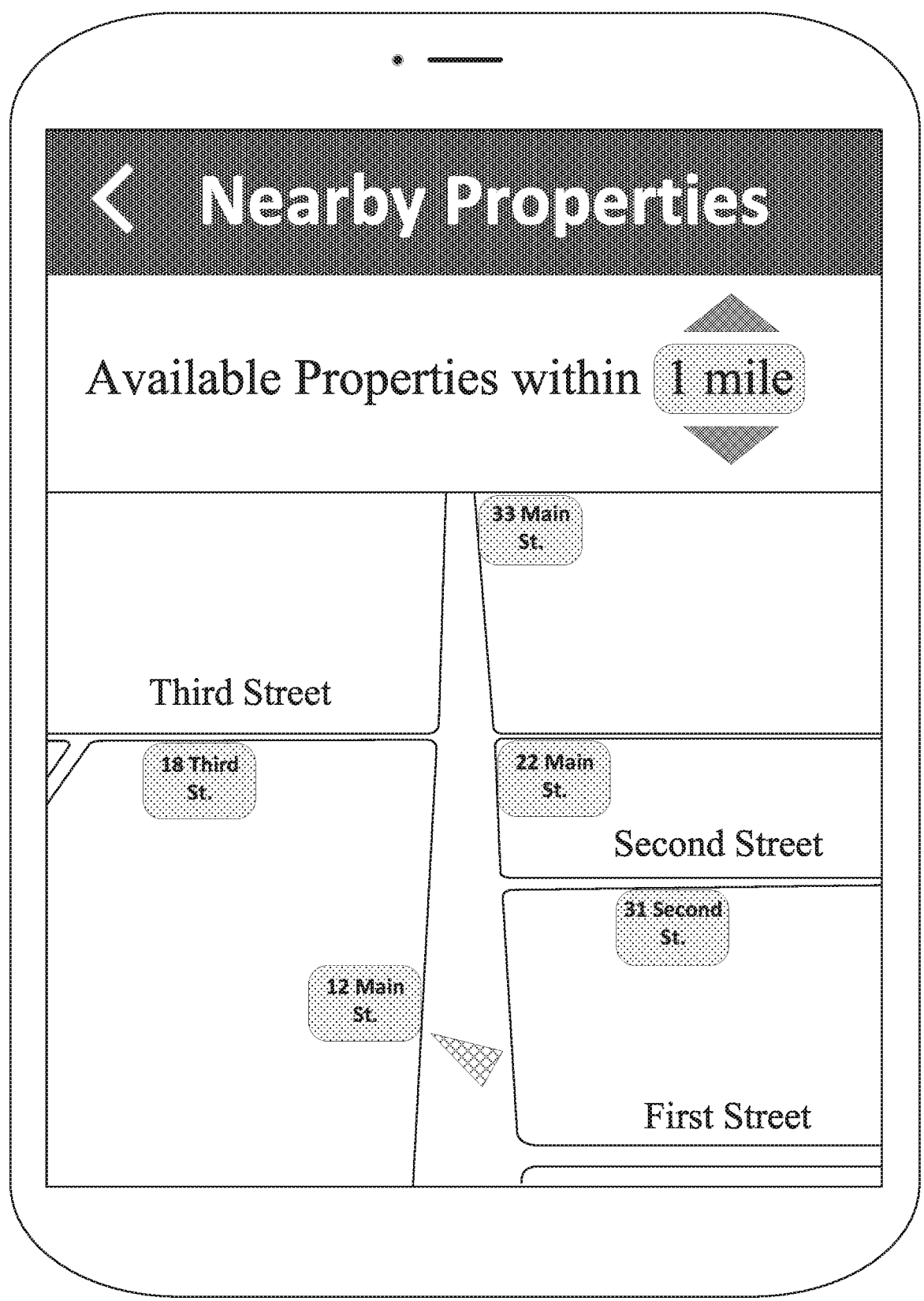
FIG. 6A-6C are illustrations of a graphical user interface of a mobile device displaying graphical elements generated by a mobile application, according to various embodiments.
Figure 6B:
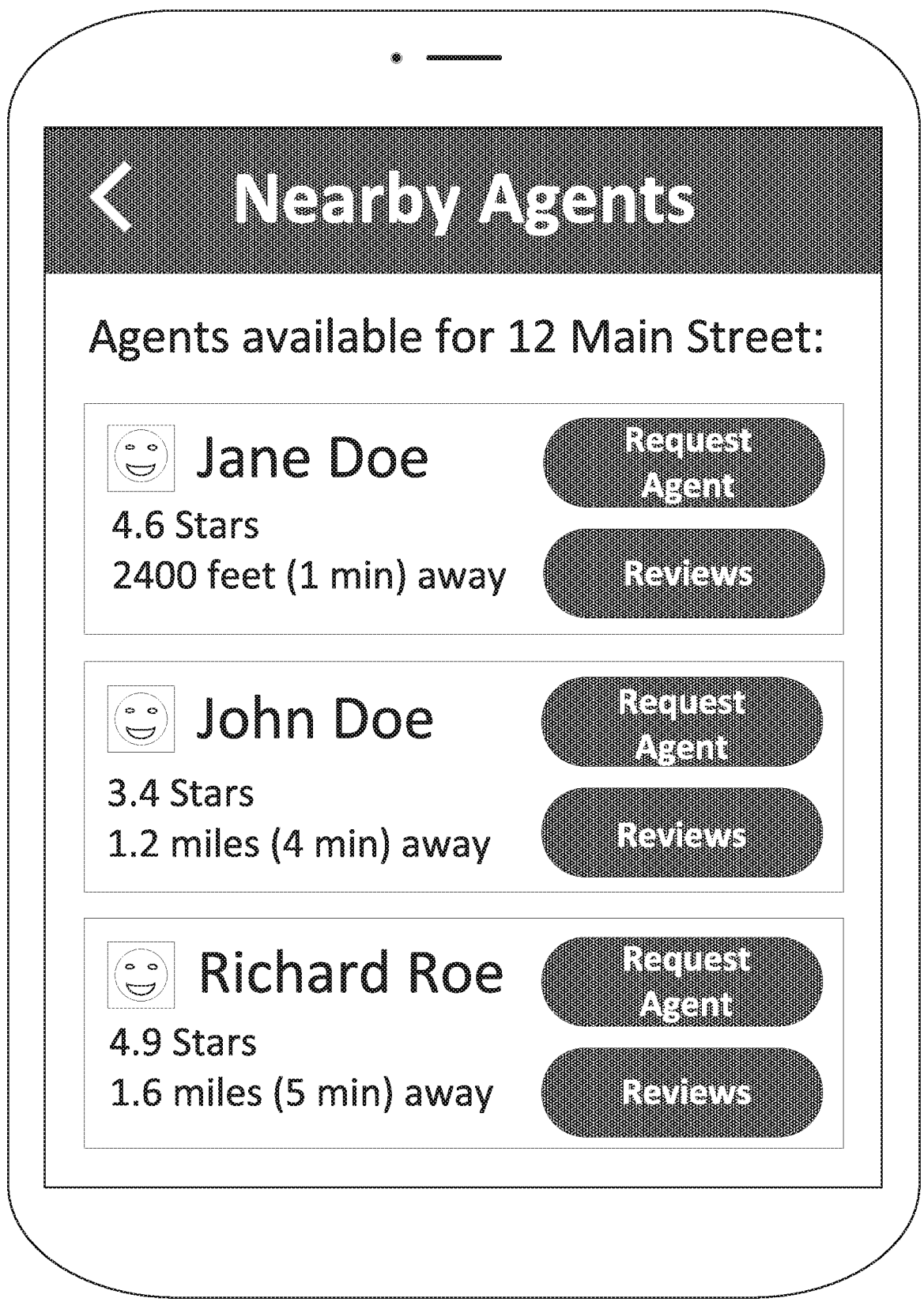
Figure 6C:
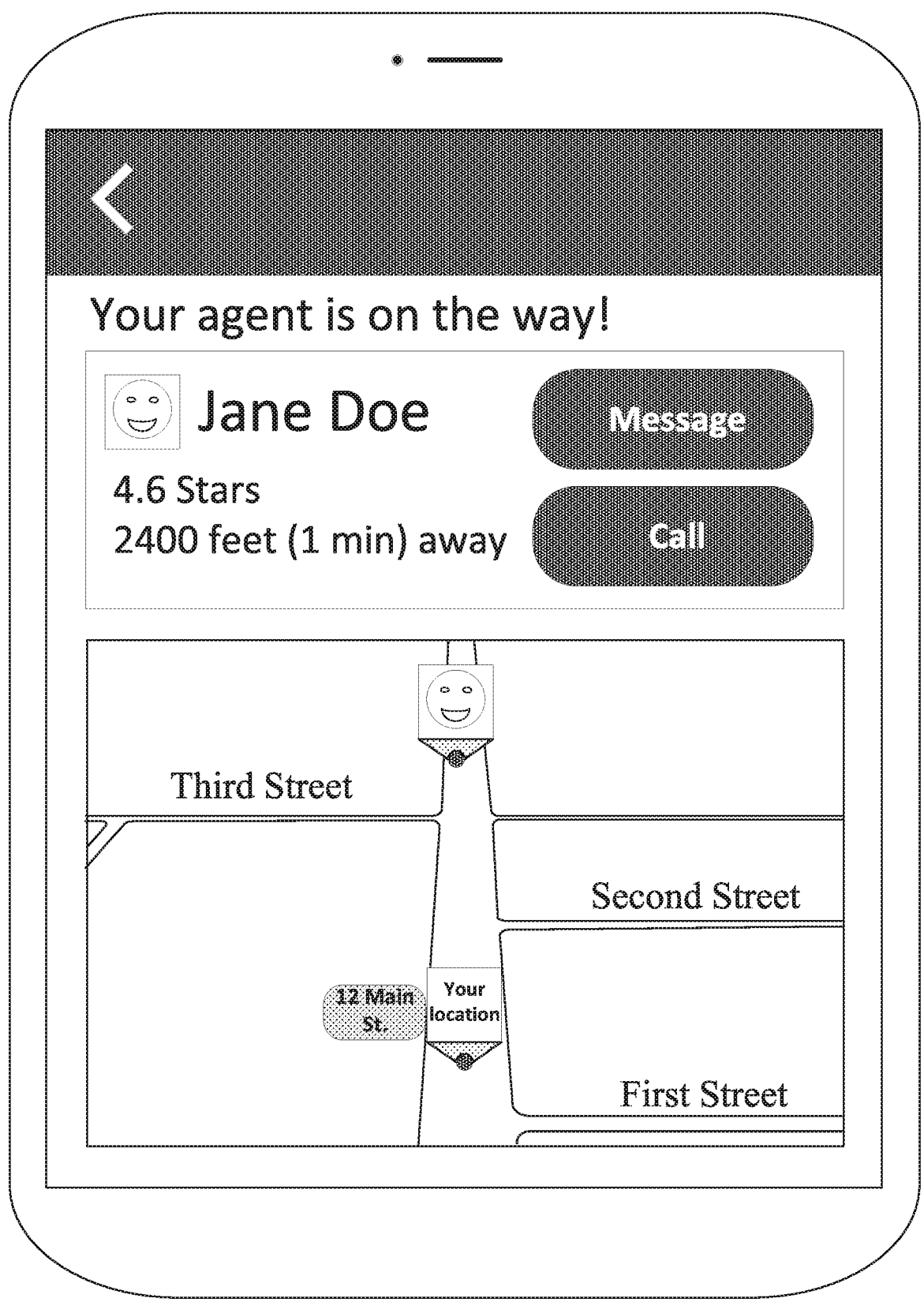

FIGS. 6A-6C are illustrations of a graphical user interface of a mobile device displaying graphical elements generated by a mobile application, according to various embodiments. FIGS. 6A-6C can be implemented by a mobile application (e.g., buyer mobile application 130 and/or mobile application 430) to cause a touchscreen display of a mobile device to show, for example, a plurality of for-sale properties (FIG. 6A), a plurality of eligible agents (FIG. 6B), and a selected agent traveling toward a selected property (FIG. 6C).

FIG. 6A shows a mobile device displaying a map with a plurality of for-sale properties within a proximity of the mobile device, according to an embodiment. A user (e.g., a client) can adjust a for-sale property search range (e.g., a tight area). For example, if the mobile application receives an input associated with the down arrow below the search range, the mobile application can respond by reducing the search range (e.g., reducing the search range from 1 mile to 2000 feet). In another example, if the mobile application receives an input associated with the up arrow above the search range, the mobile application can respond by increasing the search range (e.g., increasing the search range from 1 mile to 2 miles).

The mobile application can receive a selection of a property by detecting either of (1) an input (e.g., a contact or near contact from a user) at a region of the touchscreen associated with a particular property (e.g., 12 Main St.) or (2) a positioning of the mobile device associated with selecting a property. The positioning (e.g., location and/or orientation) of the mobile device can be used by the mobile application to select a property. In an embodiment, a location of a mobile device within a proximity (e.g., less than 500 feet) of a for-sale property can be used by the mobile application to select the for-sale property. In another embodiment, a user can point a mobile device at a for sale property (e.g., change an orientation of the mobile device such that top portion of the mobile device faces a for-sale property), and the mobile application can select the for-sale property. Once a for-sale property is selected, a plurality of eligible agents within a proximity of the mobile device may be identified and displayed on the mobile device, as shown in FIG. 6B. In another embodiment, a number of agents within a proximity of the mobile device can be identified and displayed on the mobile device. For example, text can be displayed on a touchscreen display stating "there are 6 available agents within 2 miles of this home" or "there are 6 available agents within 5 minutes of this home".

FIG. 6B shows a mobile device displaying a plurality of eligible agents within a proximity of the mobile device, according to an embodiment. The plurality of eligible agents can be displayed, for example, as a list or array of elements. A user may be able to scroll in one or more directions to see additional eligible agents. Eligible agents can be provided in an order based on, for example, a distance from the mobile device (e.g., closest agents first), a distance from the property of interest, a rating (e.g., highest rating to lowest rating), a number of times an agent has been detected at the for-sale property, or any combination thereof.

Information associated with an agent profile can be displayed in an agent element generated for an eligible agent. For example, an agent element can include a name of an agent, a picture, rating, reviews, link to a web site associated with an agent, distance from a mobile device, distance from a for-sale property, estimated travel time to the mobile device, estimated travel time to the for-sale property, contact information, or any combination thereof. Information of an agent can be automatically displayed with the agent elements or be accessible via one or more virtual buttons provided with the agent element. For example, reviews can be accessible by selecting a "Reviews" button.

The mobile application can receive a selection input associated with an agent among the eligible agents. The selection input can be a user in contact (or nearly in contact) with a region of a touchscreen of the mobile device associated with selecting an agent (e.g., "Request Agent" button). In response to receiving a selection input, the mobile application can transmit a message to a mobile device of the agent. The message can be sent directly to the agent or indirectly via a server side application. The message includes information about the for-sale property and client (e.g., location of for-sale property and client) and asks the agent to accept or reject the client. If the agent rejects, a message is transmitted to the mobile device of the client indicating that another agent should be selected. If an agent rejects at this point, the system may automatically generate negative feedback indicating that the agent rejected after selection of the agent. The mobile application can display another plurality of eligible agents omitting the rejecting agent. If the agent accepts, a message is transmitted to the mobile device of the client indicating acceptance and can provide additional information, such as, for example, a location of the agent and an estimated arrival time.

FIG. 6C shows a mobile device displaying a selected agent and a selected property, according to an embodiment. The location of the selected agent and the selected property can be displayed on a map. The selected agent can be displayed with information associated with an agent profile.

In an embodiment, the mobile device can display a map showing the selected agent's location over time. A user (e.g., a client) can view the selected agent traveling, e.g., toward the for-sale property. The mobile application can continuously update the map to provide a real-time location of the mobile device associated with an agent. An estimated time of arrival of an agent can be determined by the mobile application and displayed on the mobile device.

In an embodiment, the application server can determine that the agent and client have made contact. For example, the application server can determine that a mobile device of an agent and a mobile device of a client are in approximately the same location (e.g., within 50 feet of one another) or receive a message from either mobile device indicating that contact is made. The mobile device of the agent and/or the mobile device of the client can determine that contact is made by, for example, a near field communication, bumping the phones together, and/or determining that the mobile device of the agent and the mobile device of the client are in approximately the same location (e.g., within 50 feet of one another). Once the mobile application determines that both mobile devices are in approximately the same location, the mobile application transmits a message to the application server indicating that the agent and client have made contact.

In an embodiment, a mobile application can hide some information from a user (e.g., a client or an agent). For example, contact information of an agent can be hidden from a client or vice-versa. Although a client may not be able to see the contact information (e.g., a phone number, email address, etc.), the mobile application can connect the client with the agent without the client receiving the contact information. A touchscreen of a mobile device can detect an input in a region associated with connecting with an agent (e.g., a "Call" button or a "Message" button). In response to receiving an input associated with contacting an agent, the mobile application can connect (e.g., by calling, messaging, video chatting etc.) the mobile device of the client with a mobile device of an agent. In some embodiments, the messaging functionalities are performed wholly within the application. Text or voice data is transmitted between client devices via a backend server and represented within the application's user interface.

In other embodiments, the mobile device of the client can be connected with the mobile device of the agent through the application server or through another communication method (e.g., direct the communication to a phone's default calling or SMS service). The application generates an SMS message or places a phone or video call on behalf of an agent/user and forwards the message or phone call to the other device within a showing event. In this manner, each client device has pre-registered contact information with the application server in order for the application server to facilitate message transfer.

In this manner, both clients and agents are not required to provide their contact information to the other party in a showing event. Thus, in the event of a bad experience from either party, all contact is easily severed.

FIGS. 7A-7E are flow charts of an immediate proximity property showing application (hereinafter "client application") for a device associated with a client, according to various embodiments.

Figure 7A:
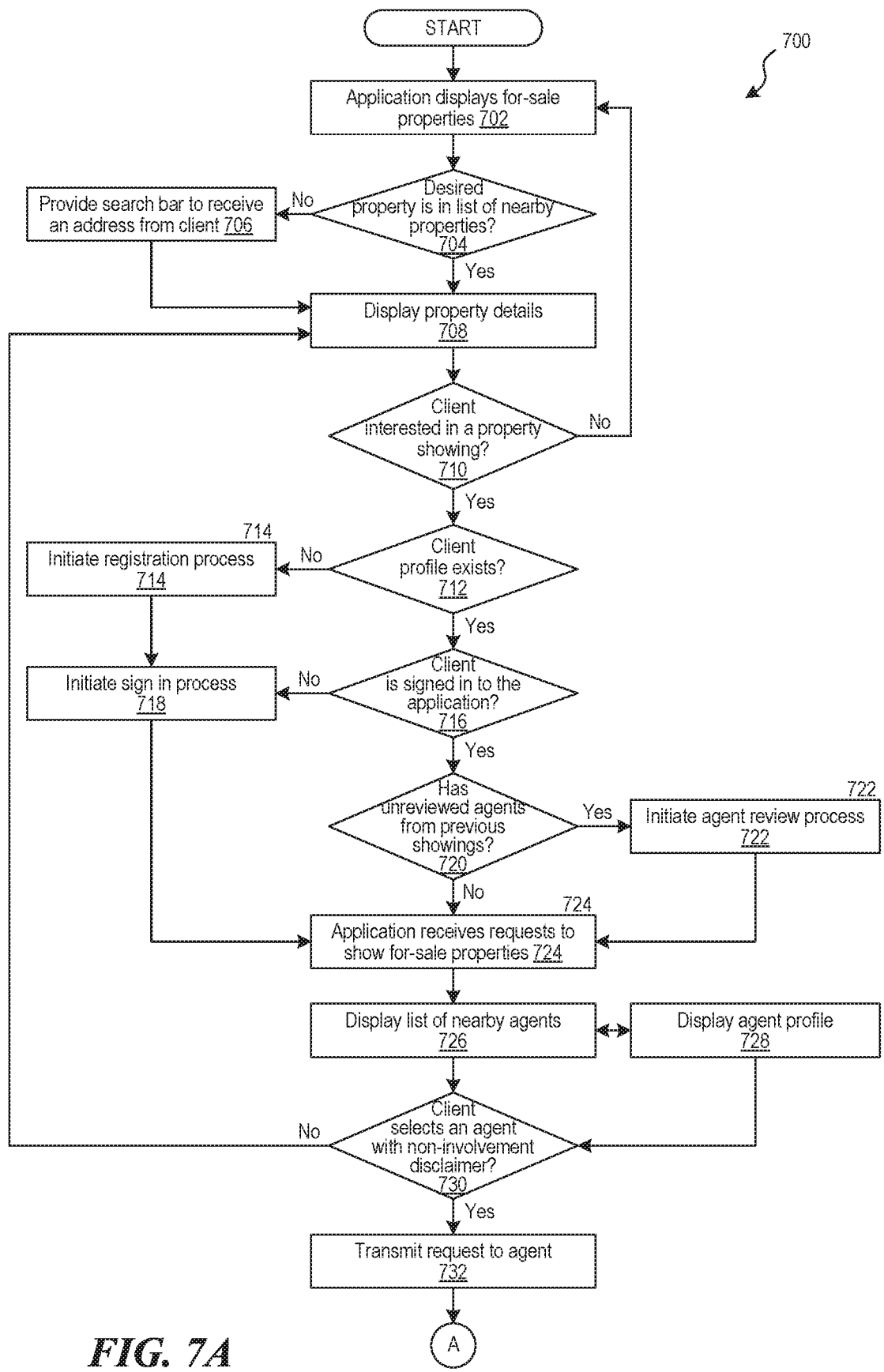
FIGS. 7A-7E are flow charts of an immediate proximity property showing application for a device associated with a client, according to various embodiments.

FIG. 7A is a flow chart of a client application managing communication between a client device and a nearby agent device among a plurality of agent devices to facilitate a showing of a for-sale property within a proximity of the client device, according to various embodiments.

The client application can startup in response to a user selecting an icon associated with the mobile application. The client application shows for-sale properties within a proximity of a client device (step 702). The proximity can range from approximately 0 feet to several miles. The search proximity can be configurable by a client. For example, the client application can include arrows for a client to increase or decrease a search proximity.

The client application provides (e.g., displays or recites through a speaker) for-sale properties on the client device. For example, a list of for sale properties or a map showing for-sale properties can be displayed. The client application determines whether the client is interested in the provided for-sale properties (decision 704). If the client application determines that the client is not interested in the provided for-sale properties (decision 704, No), the client application provides a search bar configured to receive an address from the client or activates a microphone configured to receive an address from the client (step 706). If the client application determines that the client is interested in a for-sale property among the provided for-sale properties (decision 704, Yes), the client application provides information about the for-sale property (e.g., location, price, lot size, square footage, number of rooms and bathrooms, sale history, local school information, local crime statistics, etc.) (step 708).

The client application determines whether the client is interested in a showing of the for-sale property (decision 710). If the client application receives an input indicating that the client is not interested in a showing of the property (decision 710, No), the client application returns to step 702. If the client application receives an input indicating that the client is interested in a showing of the property (decision 710, Yes), the client application determines if the client has an existing client profile (decision 712).

If the client application determines that no client profile exists for the client (decision 712, No), a registration process is initiated (step 714) and the client signs into the client application (step 718). If the client application determines that a client profile does exist (decision 712, Yes), the client application determines if the client is signed into the client application (decision 716). If the client is not signed in to the client application (decision 716, No), the sign in process is initiated (step 718). If the client is already signed in to the client application (decision 716, Yes), the client application determines whether the client profile has unreviewed agent profiles from previous showings (decision 720).

If the client profile has unreviewed agent profiles from previous showings (decision 720, Yes), the client application initiates a review process for the agent profile from the previous showing (step 722). Once the client completes the review for the agent profile from the previous showing, the client application moves forward with the present showing.

The client application receives the request to show the for-sale property (step 724). The client application transmits the request to the application server, which transmits the request to a plurality of agents. Available agents among the plurality of agents respond by transmitting a message to the application server indicating availability. An agent application running on a mobile device of an agent can automatically respond indicating availability or non-availability based on whether a showing is already initiated for the agent or not. In another embodiment, the application server tracks activities of the plurality of agents, including on-going showings of for-sale properties, to identify which agents are available. The mobile application receives a list of nearby agents (e.g., agents within a configurable distance or within a configurable travel time from the mobile device), and provides the list of agents to the client (e.g., by displaying the list of agents or reciting the list of agents via a speaker) (step 726). The client can select an agent of the list of nearby agents to view a profile of an agent including details about the agent (e.g., name, picture, sales history, distance away, agent website, etc.) (step 728).

The client application determines whether the client disclaims involvement with another agent (decision 730). A non-involvement disclaimer may ask the client to indicate whether a preexisting contractual relationship exists between the client and another agent. The client application can provide a prompt, for example, including text stating "Do you currently have a contractual relationship with any real-estate agent?". The client application can provide a series of prompts (e.g., "Does the contractual relationship implicate the selected property?") to request more information from the client if "yes" is selected and move on if "no" is selected. If the client application determines, based on information received from the client, that the client has a conflicting contractual relationship with another agent (decision 730, No), the client application returns to step 708. If the client application determines the client does not have a conflicting contractual relationship with another agent (decision 730, Yes), the client application confirms selection of the agent and causes the mobile device to transmit a request to the agent (e.g., via the application server) (step 732).

Figure 7B:
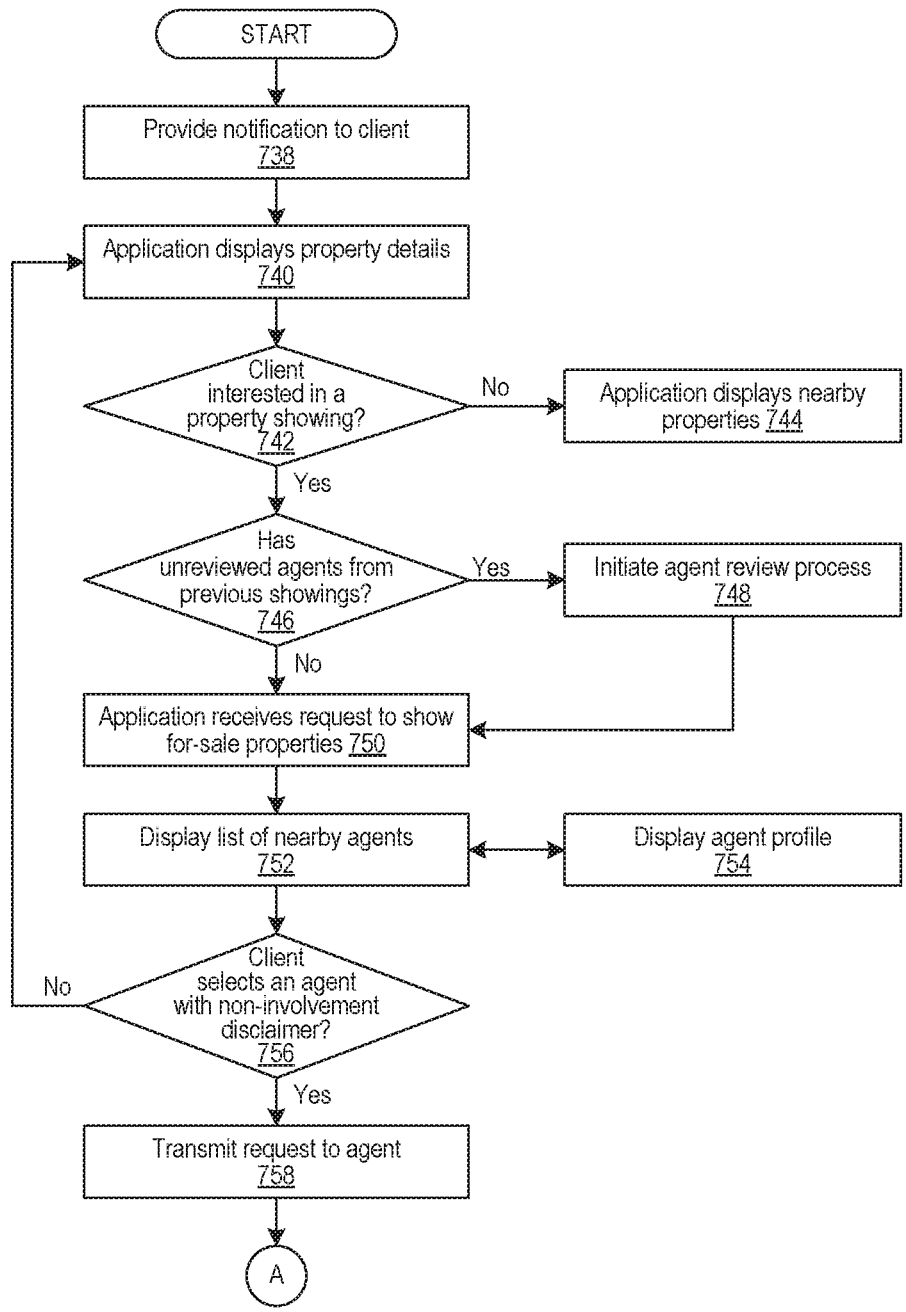

FIG. 7B is a flow chart of a client application facilitating a communication between a client device and an agent device by providing the client device with a notification of a for-sale property, according to various embodiments.

The client application can be logged into a client account and include information about the client and/or client device including, for example, location, preferences, and/or search history. A notification setting in the client application can be turned on or off to enable or disable notifications from the client application. If notification settings are turned on, notifications associated with for-sale properties within a proximity of a client device can be provided (step 738). Thus, even if a client is not actively using the client application, for-sale properties within a proximity of a client device can be displayed on the client device.

The notification can include one or more options for a client provided as virtual buttons displayed on a touchscreen of the client device. The one or more options can include, for example, view property details, find eligible agents, exit notification, and disable notifications. If view property details is selected, the client application displays details about the property including, for example, location, lot size, indoor area, and number of rooms and/or bathrooms (step 740).

The client application determines whether the client is interested in a showing of the for-sale property (decision 742). If the client application receives an input indicating that the client is not interested in a showing of the property (decision 742, No), the client application provides information regarding nearby for-sale properties (step 744). If the client application receives an input indicating that the client is interested in a showing of the property (decision 710, Yes), the client application determines whether the client profile has unreviewed agent profiles from previous showings (decision 746).

If the client profile has unreviewed agent profiles from previous showings (decision 746, Yes), the client application initiates a review process for the agent profile from the previous showing (step 748). Once the client completes the review for the agent profile from the previous showing, the client application moves forward with the present showing.

The client application receives the request to show the for-sale property (step 750). The client application transmits the request to the application server, which transmits the request to a plurality of agents. Available agents among the plurality of agents respond by transmitting a message to the application server indicating availability. An agent application running on a mobile device of an agent can automatically respond indicating availability or non-availability based on whether a showing is already initiated for the agent or not. In another embodiment, the application server tracks activities of the plurality of agents, including on-going showings of for-sale properties, to identify which agents are available. The mobile application receives a list of nearby agents (e.g., agents within a configurable distance or within a configurable travel time from the mobile device), and provides the list of agents to the client (e.g., by displaying the list of agents or reciting the list of agents via a speaker) (step 752). The client can select an agent of the list of nearby agents to view a profile of an agent including details about the agent (e.g., name, picture, sales history, distance away, agent website, etc.) (step 754).

The client application determines whether the client indicates that a conflicting contractual relationship exists (decision 756). A non-involvement disclaimer may ask the client to indicate whether a preexisting contractual relationship exists between the client and another agent. The client application can provide a prompt, for example, including text stating "Do you currently have a contractual relationship with any real-estate agent?" The client application can provide a series of prompts (e.g., "Does the contractual relationship implicate the selected property?") to request more information from the client if "yes" is selected and move on if "no" is selected. If the client application determines the client does not disclaim involvement with another agent (decision 756, No), the client application returns to step 740. If the client application determines the client does disclaim involvement with another agent (decision 756, Yes), the client application confirms selection of the agent and causes the mobile device to transmit a request to the agent (e.g., via the application server) (step 758).

Figure 7C:
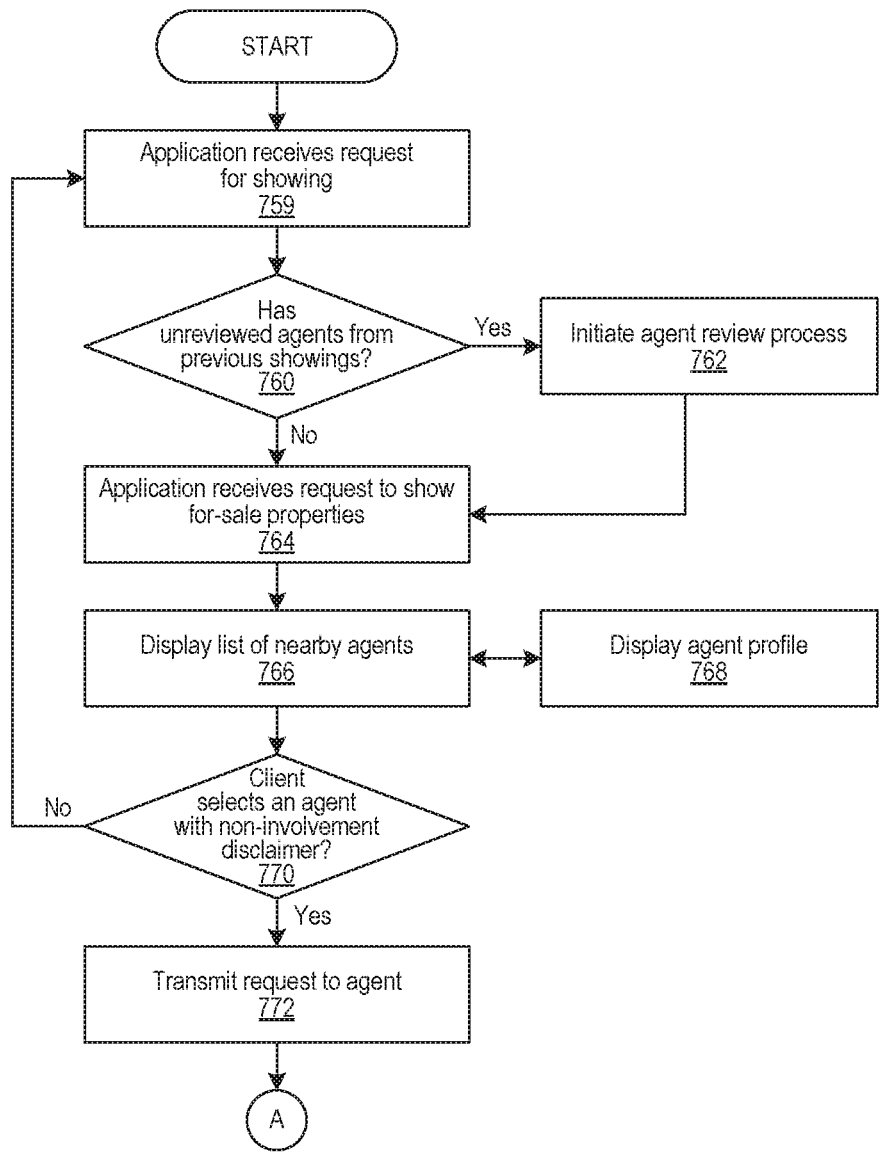

FIG. 7C is a flow chart of a client application facilitating a communication between a client device and an agent device by receiving a showing request for a for-sale property from a connected application, according to various embodiments.

A connected application running on the client device (e.g., mobile phone, desktop, laptop, etc.) other than the client application is connected to the client application (e.g., via a hyperlink). The connected application receives an input requesting a showing, and the connected application forwards the showing request to the client application (step 759).

In response to receiving the showing request from the connected application, the client application determines whether the client profile has unreviewed agent profiles from previous showings (decision 760). If the client profile has unreviewed agent profiles from previous showings (decision 760, Yes), the client application initiates a review process for the agent profile from the previous showing (step 762). Once the client completes the review for the agent profile from the previous showing, the client application moves forward with initiating the present showing.

The client application receives the request to show the for-sale property (step 764). The client application transmits the request to the application server, which transmits the request to a plurality of agents. Available agents among the plurality of agents respond by transmitting a message to the application server indicating availability. An agent application running on a mobile device of an agent can automatically respond indicating availability or non-availability based on whether a showing is already initiated for the agent or not. In another embodiment, the application server tracks activities of the plurality of agents, including on-going showings of for-sale properties, to identify which agents are available. The mobile application receives a list of nearby agents (e.g., agents within a configurable distance or within a configurable travel time from the mobile device), and provides the list of agents to the client device (e.g., by displaying the list of agents or reciting the list of agents via a speaker) (step 766). The client can select an agent of the list of nearby agents to view a profile of an agent including details about the agent (e.g., name, picture, sales history, distance away, agent website, etc.) (step 768).

The client application determines whether the client selects an agent with a non-involvement disclaimer (decision 770). If the client application determines the client does not select the agent with the non-involvement disclaimer (decision 770, No), the client application returns to the connected application. If the client application determines the client does select the agent with the non-involvement disclaimer (decision 770, Yes), the client application confirms selection of the agent and causes the mobile device to transmit a request to the agent (e.g., via the application server) (step 772).

Figure 7D:
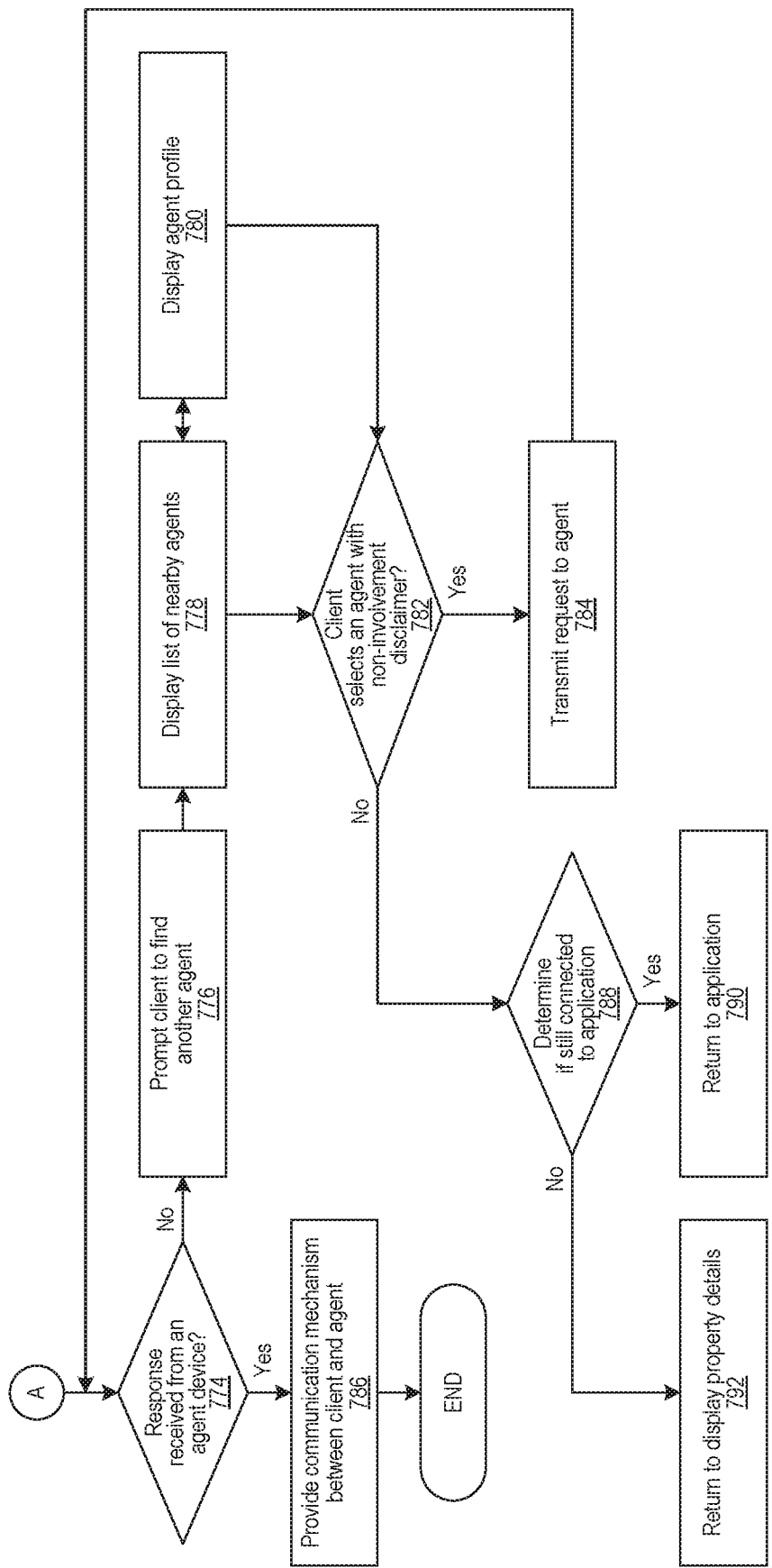

FIG. 7D is a flow chart of a client application facilitating communication between the client device and the agent device.

Once the client application causes the client device to transmit a request to the agent device (e.g., as in step 732, 758, and 772), the client application determines whether a response is received from an agent device (decision 774). A default time period (e.g., 1 minute) can be set as a maximum wait time for a reply from an agent device. If the agent device responds within the default time period (decision 774, Yes), the client application provides a communication mechanism for a client to communicate with the agent device (e.g., by enabling an in-application messaging service) (step 786).

If the agent device fails to respond within the default time period, the client application determines that the agent device has not responded (decision 774, No), the client application prompts the client to find another agent (step 776). The client application receives a list of nearby agents (e.g., agents within a configurable distance or within a configurable travel time from the mobile device), and provides the list of agents to the client device (e.g., by displaying the list of agents or reciting the list of agents via a speaker) (step 778). The client can select an agent of the list of nearby agents to view a profile of an agent including details about the agent (e.g., name, picture, sales history, distance away, etc.) (step 780). The client application determines whether the client selects an agent with a non-involvement disclaimer (decision 782). If the client application determines the client does not select the agent with the non-involvement disclaimer (decision 782, No), the client application returns to either of property details (if originating within the client application) or to a connected application (if originating from the connected application). If the client application determines the client does select the agent with the non-involvement disclaimer (decision 782, Yes), the client application confirms selection of the agent and causes the mobile device to transmit a request to the agent (e.g., via the application server) (step 784).

Figure 7E:
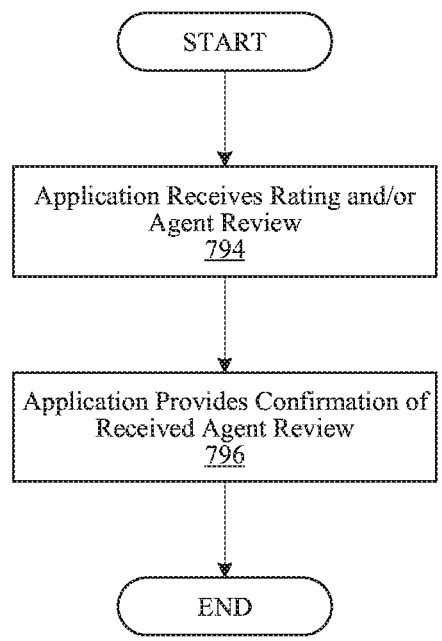

FIG. 7E is a flow chart of a client application facilitating a review of an agent profile after a showing of a for-sale property, according to various embodiments. The client application initiates an agent review process (e.g., as in step 722, step 748, and step 762). The client application prompts the client to provide a review associated with an agent profile so a client can review an agent with which the client previously scheduled a showing through the client application. The client application receives a rating and/or review via an interface (e.g., interface 138 of FIG. 1) of the client device (step 794). The client application provides confirmation that the agent review is received (step 796). The confirmation can include a message thanking the client for the review and/or rating, whole or part of the received review, other reviews, other ratings, etc.

Figure 8A:
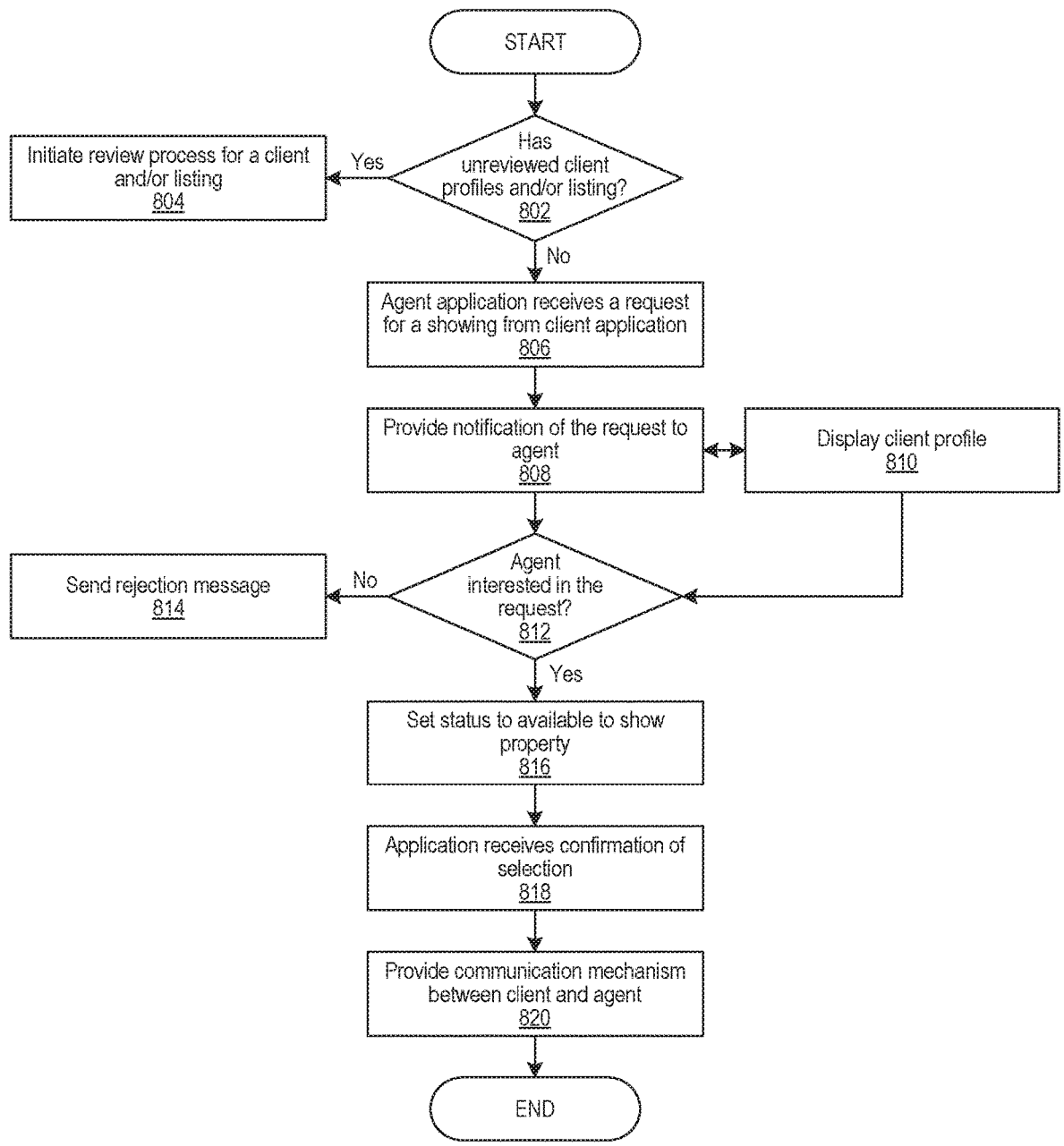
FIGS. 8A-8B are flow charts of an immediate proximity property showing application for a device associated with an agent, according to various embodiments.
Figure 8B:
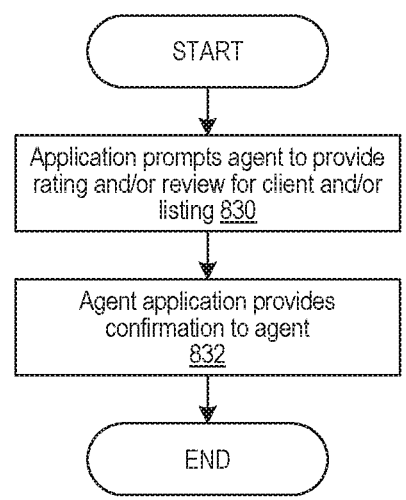

FIGS. 8A-8B are flow charts of an immediate proximity property showing application (hereinafter "agent application") for a device associated with an agent, according to various embodiments.

FIG. 8A is a flow chart of an agent application facilitating communication between an agent device and a client device, according to various embodiments. An agent can select an active status in the agent application to receive showing requests from client devices.

The agent application determines if there are any unreviewed clients profiles or listings from prior showings (decision 802). If there are unreviewed client profiles and/or listings (decision 802, Yes), the agent application initiates the review process for a client and/or listing (step 804). If the agent application determines that there are no unreviewed client profiles or listings (decision 802, No), the agent application enables receipt of client showing requests.

The agent application receives a request for a showing from a client application (step 806). The agent application provides notification of the request to the agent (e.g., by displaying the request) (step 808). The agent can select the notification, and in response to receiving an input from the agent, the agent application provides a client profile having details about the client and/or listing (e.g., client location, listing location, client name, client picture, etc.) (step 810). In an embodiment, a client profile is hidden from the agent until the agent has accepted the showing request. In another embodiment, a client profile is hidden from the agent until the client selects the agent. Limiting access to client information, by the agent application, may reduce a likelihood that an agent can utilize client information (e.g., contact a potential client) before authorized to communicate with the client.

The agent application determines whether the agent is interested in the request by receiving an input from the agent (e.g., the agent selects an "Approve" or "Reject" button or fails to act) (decision 812). If the agent application determines the agent is not interested in the request (e.g., by selecting a "Reject" button or failing to act in a time period) (decision 812, No), the agent application provides a message to an application server and/or the client application indicating that the agent has rejected (step 814). If the agent application determines that the agent is interested in the request (decision 812, Yes), the agent application sets a status associated with the agent profile as available to show the for-sale property (step 816).

The agent profile can be provided to the client application among a plurality of agent profiles. If the client selects the agent profile among the plurality of agent profiles, the client application transmits a message to the agent application indicating that the agent profile is selected. The agent application receives confirmation of the selection from the client application (e.g., via the application server) (step 818).

The agent application can enable communication with the client application (step 820). The enabled communication can be within or outside of the agent application. For example, the enabled communication can be through an in-app messaging or calling service. In another example, the agent application can provide contact information that links to default messaging or calling applications on the agent device.

FIG. 8B is a flow chart of an agent application facilitating a review of a client profile and/or listing after a showing of a for-sale property, according to various embodiments. The agent application can initiate a review process (e.g., as in step 804). The agent application prompts the agent to provide a rating and/or review for a client and/or listing (step 830). The agent submits the rating and/or review which is received and stored by the agent application. The agent application provides confirmation to the agent of the rating and/or review (step 832).

Figure 9A:
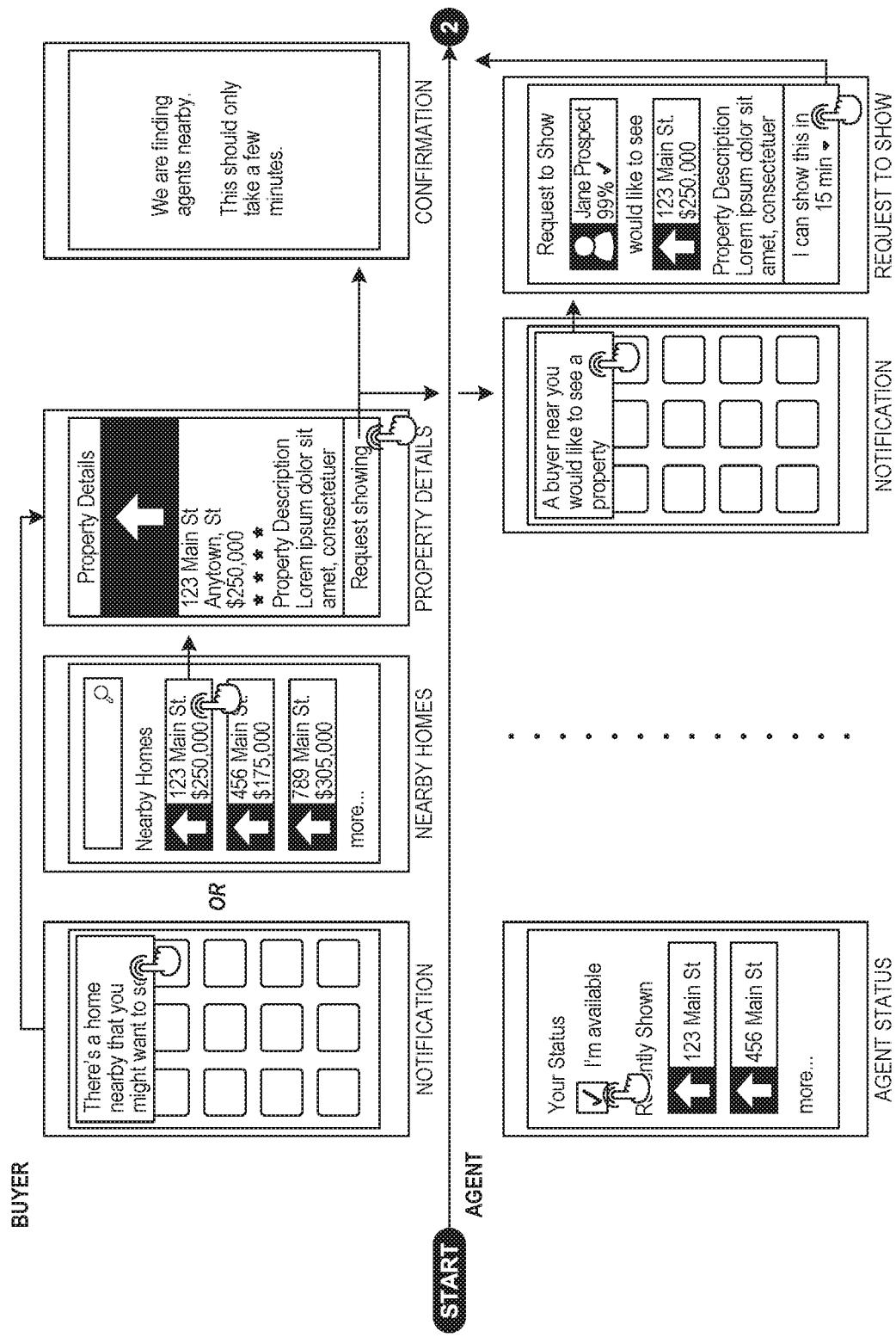
FIGS. 9A-9C are illustrations of managing communications on a client device and an agent device, according to various embodiments.
Figure 9B:
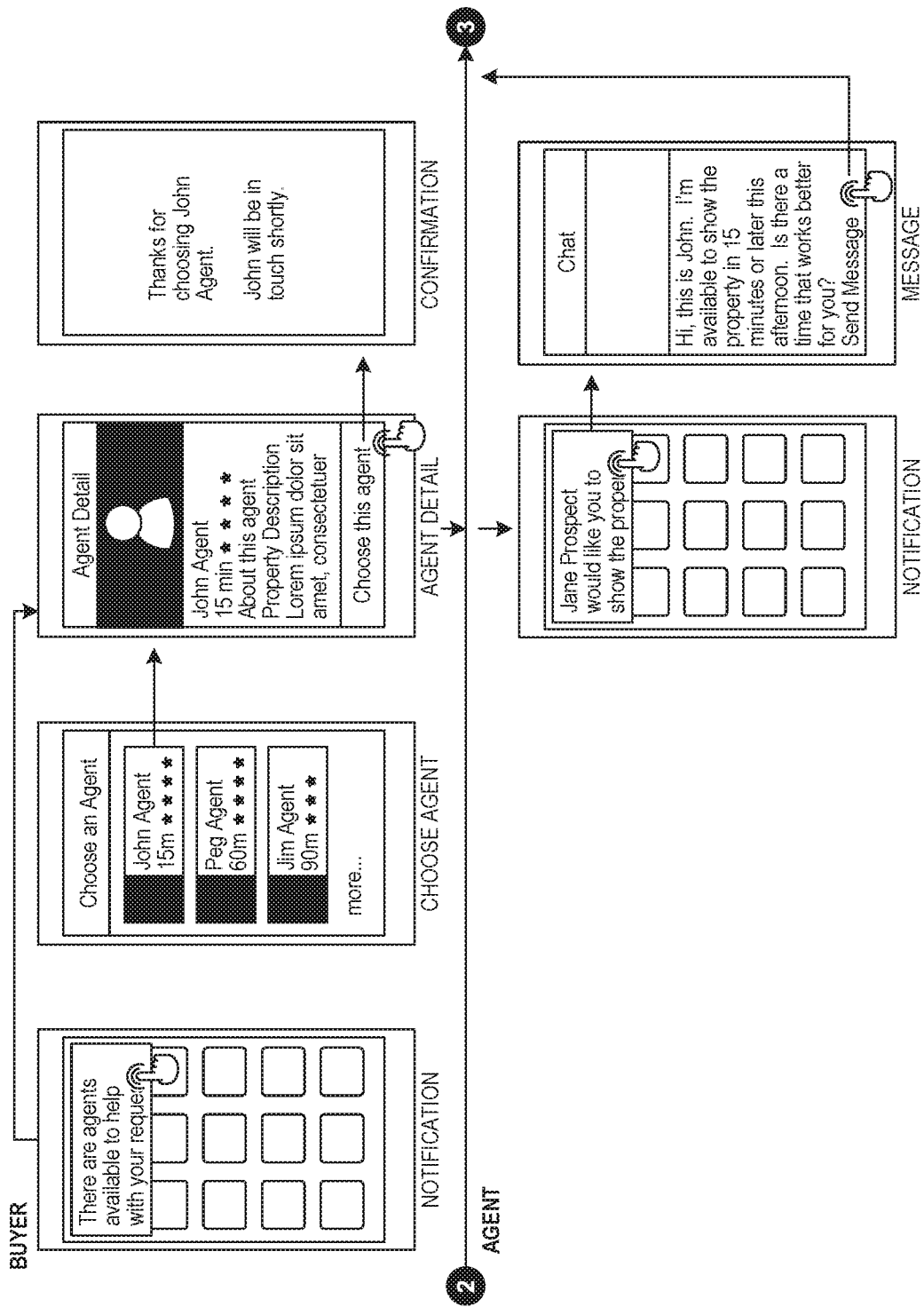
Figure 9C:
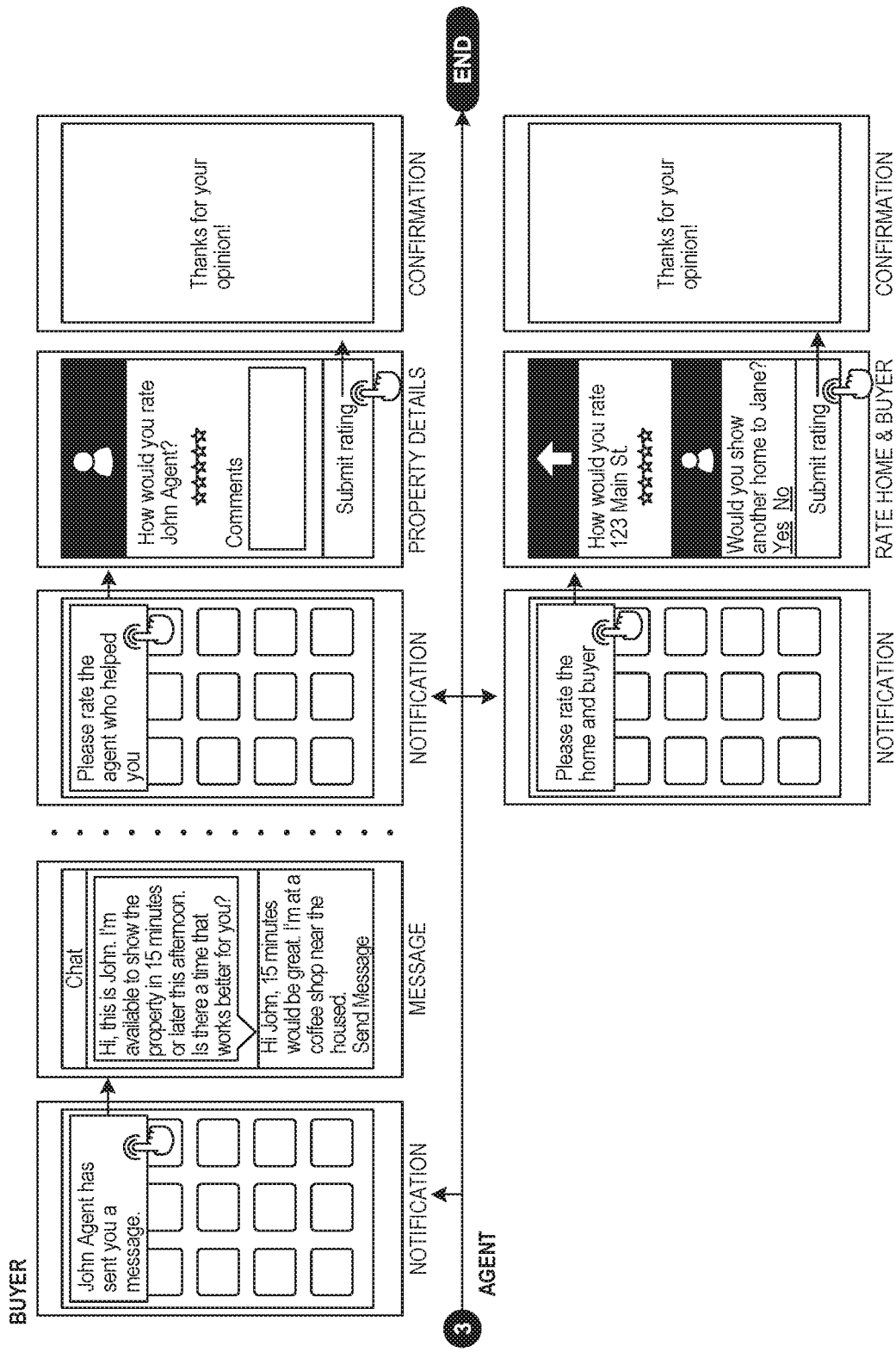

FIGS. 9A-9C are illustrations of managing communications on a client device and an agent device, according to various embodiments. The client device may be operated by a prospective real-estate buyer, and the agent device may be operated by a real-estate agent. A client application can be running on the client device and be logged into a client profile. An agent application can be running on the agent device and be logged into an agent profile. Example elements generated by a graphical user interface for display on a touchscreen display are shown. The shown devices and graphical elements are merely examples and should not be construed as limiting. Various client devices, agent devices, and output mechanisms (e.g., touchscreen display, speakers, haptic device, etc.) are contemplated.

FIG. 9A shows an method of selecting a property, according to various embodiments. The client application can provide a prompt (e.g., a notification) indicating that a property is available within a proximity of the client device. The client application can receive an input indicating selection of the prompt (e.g., by detecting contact with a region of a touchscreen display in which a notification is displayed), and provide a list of nearby properties. The client application can receive an input indicating selection of a property (e.g., by detecting contact with a region of a touchscreen display in which a property icon is displayed), and provide details about the selected property. In response to receiving an input associated with a showing request, the client application transmits a message to at least one agent device (e.g., via an application server).

In order to receive notifications (e.g., generated in response to a message from the client application), a profile of an agent device must indicate availability to receive showing notifications. The notification can indicate that a buyer nearby would like to see a property. An agent application on the agent device can receive an input indicating that the agent is willing to show the property. The agent device can transmit a message to the client device indicating availability of the agent to show the property. The agent device can display details of a client profile.

FIG. 9B shows an method of selecting an agent profile among a plurality of agent profiles, according to an embodiment. The client application can generate a notification indicating that agents are available for the property. The client device can display at least one agent available to show the selected property. An input can be received to view agent details, and a profile of the selected agent can be provided. Another input can be received indicating selection of an agent, and a message can be transmitted to the agent device of the selected agent (e.g., via the application server). The agent device can receive the message indicating selection of the agent, and the agent application can generate a notification indicating that the agent is selected. The notification can be selected and communication between the agent device and the client device can be established (e.g., via the application server). FIG. 9C shows an method enabling communication in the application and facilitating a review of a profile (e.g., an agent profile and a client profile), according to an embodiment. The client device can receive a message from the agent device (e.g., via the application server) and vice-versa. The client application can generate graphical elements for display on the client device to provide information (e.g., a text message, an audio recording, etc.) received from the agent device to the client. Exchanging information via the messaging service facilitated by the client application and the agent application can enable the client and agent to coordinate, for example, a time of a showing or other details related to a property of interest.

Providing an in-application means of communication streamlines the process and prevents any unwanted sharing of contact information. In some embodiments, when a given showing event is complete, the ability to communicate between the agent and the user within the application may be disabled. Disabling communication may be an activated setting for each party, or automatic based on a determination that a showing is complete. In some embodiments, rather than disabling communication within the application between matched agents/users, the communication features are merely made less intrusive in the user interface, or on the device. For example, when moving to a less intrusive interface, the application may cease sending push notifications to the agent's/user's device, and/or communication may be indexed and only accessed via revisiting a page within the application for the property/address shown by the agent.

The client application and the agent application can determine that a showing is complete by, for example, an input from either of the client or agent indicating that the showing is complete and/or expiration of an estimated time period for the showing. In response to determining that the showing is complete, the client application and the agent application can generate prompts (e.g., notifications) requesting reviews for the agent profile and client profile, respectively. A review page can include a rating field (e.g., numerical rating, rating out of 5 stars, etc.), comment field, and recommendation field (e.g., "Would you recommend this agent to a friend?" or "Would you show Jane another property?"). Data received from the review can be stored with a user's profile and used to facilitate future interactions.

Severing some connection or "putting some distance" between the agents/users after a showing via a construct of the application interface helps reduce unwanted attention from pushy salesmen agents, or needy users. Thus, use of the application prevents unwanted, and annoying contact between parties because the application did not actively share contact information.

The agent application provides additional analytical features as well. These features include charts illustrating data (not including personally identifiable information) as to the types and locations of showing requests that are happening. The charts may include temperature diagrams the colorize certain areas in order to encourage more agents to be available in the given "high temperature" areas. Another analytical feature allows agent to view statistics as to the number and frequency that client users view the agent user's profile page.

The agent application is further provided with additional tools to ensure the quality of showings. One such tool enables clients to prequalify for a mortgage or home loan online with a third party. The application receives this information (prequalification and the amount) and forwards the information to the agent as part of the original showing request. This helps the agent ascertain if the client is truly serious about purchasing the property. Where a given client has been qualified for an amount far below the asking price for the given property, the agent may be less inclined to show the property.

Agents are also enabled to advertise their open house showings. Agents may register their open houses to provide to relevant users' feeds and/or notifications as to those showings. The feeds and notifications may trigger on a client device based on the client opting in for such notifications on a given property.

These features encourage more agents to adopt the application by providing tools to help the agent. A high adoption rate of the application correlates with more effective analytical data and overall responsiveness of the application.
Computer FIG. 10 is a diagrammatic representation of a machine in the example form of a computer system 20 within which a set of instructions, for causing the machine to perform any one or more of the methodologies or modules discussed herein, can be executed.

Figure 10:
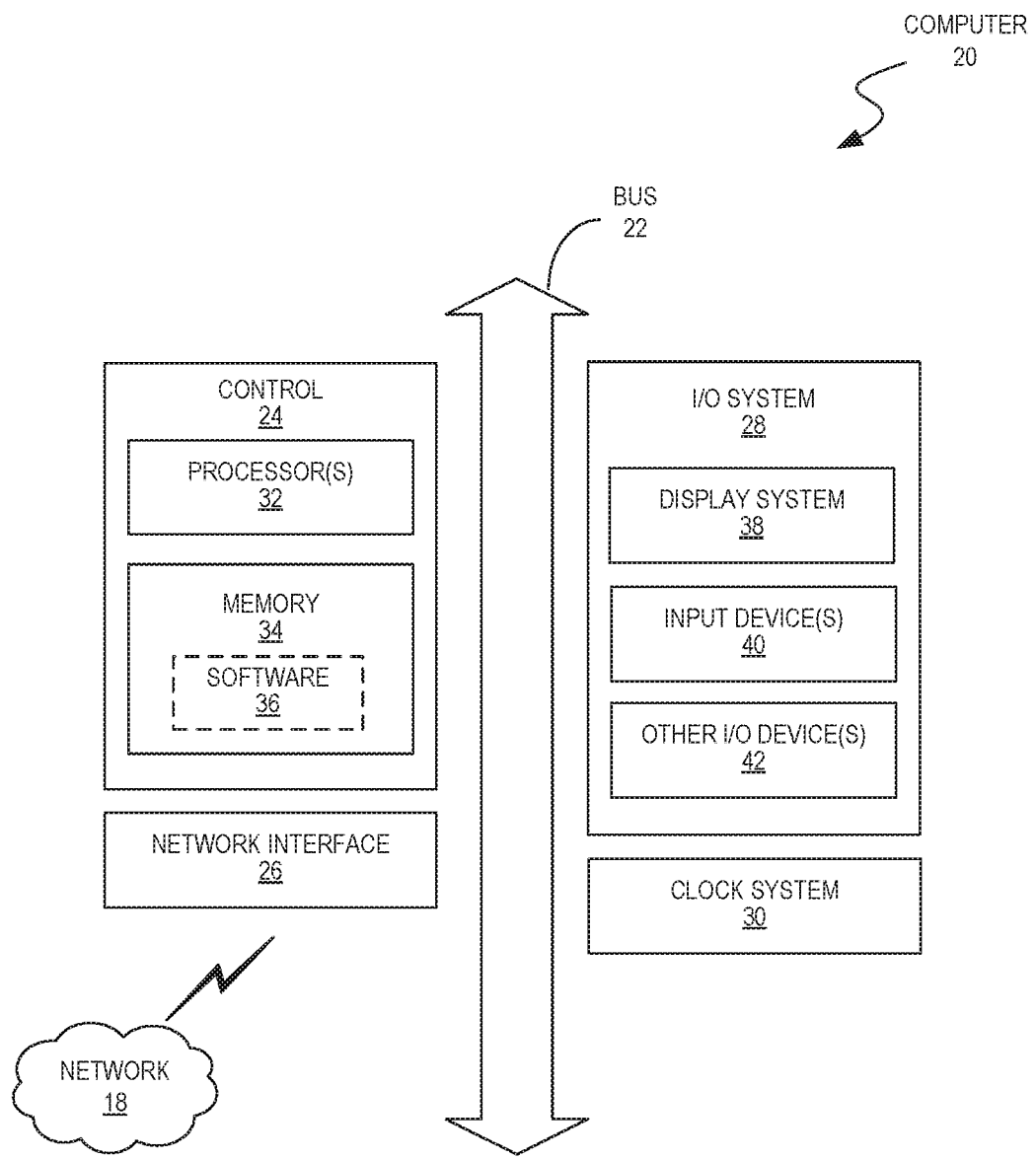
FIG. 10 is a diagrammatic representation of a computer system within which the above-described apparatus can be implemented, and within which a set of instructions for causing the machine to perform any one or more of the methodologies or modules discussed herein can be executed.

In the example of FIG. 10, the computer system 20 includes a processor, memory, non-volatile memory, and an interface device. Various common components (e.g., cache memory) are omitted for illustrative simplicity. The computer system 20 is intended to illustrate a hardware device on which any of the components described in the example of FIGS. 1-9 (and any other components described in this specification) can be implemented. The computer system 20 can be of any applicable known or convenient type. The components of the computer system 20 can be coupled together via a bus or through some other known or convenient device.

This disclosure contemplates the computer system 20 taking any suitable physical form. As example and not by way of limitation, computer system 20 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 20 can include one or more computer systems 20; be unitary or distributed; span multiple locations; span multiple machines; or reside in a cloud, which can include one or more cloud components in one or more networks. Where appropriate, one or more computer systems 20 can perform without substantial spatial or temporal limitation one or more steps of one or more methods described or illustrated herein. As an example and not by way of limitation, one or more computer systems 20 can perform in real time or in batch mode one or more steps of one or more methods described or illustrated herein. One or more computer systems 20 can perform at different times or at different locations one or more steps of one or more methods described or illustrated herein, where appropriate.

The processor can be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 20. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory cannot even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 20. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 20 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods can vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it cannot have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method for facilitating the selection and showing of a for-sale property between a real estate agent and a client comprising:
   periodically determining, by a client application instanced on a first mobile device, a first stage determination of location data of the first mobile device via GPS coordinates identified via an onboard GPS sensor, and orientation data of the first mobile device identified via one or more onboard motion sensors, and wherein the first mobile device is associated with a first user of a first user class;
   calculating a tight area based on a predicted direction of the first user using the location data of the first mobile device and orientation data of the first mobile device, wherein the tight area is further filtered from the first stage determination of location data and orientation data of the first mobile device based on proximal for-sale properties;
   determining, by an application server, a list of for-sale property within the calculated tight area based on the location data from the first mobile device, the location data indicating that the first mobile device is within a predetermined proximity of a for-sale property of the list of for-sale property, wherein the location data associated with the first mobile device includes the orientation of the first mobile device, and wherein the orientation of the first mobile device is determined by the first user pointing the first mobile device at the for-sale property;
   receiving, by the application server, a selection of a first for-sale property from the list of for-sale property, wherein the selection of the first for-sale property from the list of for-sale property is determined using the orientation of the first mobile device, wherein the orientation of the first mobile device is an orientation pointed at the first for-sale property;
   periodically triggering, by the application server, GPS coordinate checks via GPS sensors on a plurality of mobile devices each corresponding to a respective plurality of users of a second user class, the GPS coordinate checks indicate current locations of the users of the second class relative to the first for-sale property, the plurality of users of the second user class each associated with the plurality of mobile devices each within a second predetermined proximity of the first for-sale property;
   querying, by the application server, a subset of the plurality of users of the second user class for a current status and an estimated time of arrival at the first for-sale property, the subset of the plurality of users of the second user class identified based on the GPS coordinate checks of the plurality of mobile devices that correspond to devices within the second predetermined proximity of the first for-sale property, wherein the current status of the subset of the plurality of users of the second class is designated available in response to receipt by the application server of a message from the plurality of mobile devices respectively corresponding to the subset of the plurality of users of the second user class;
   transmitting, to the first mobile device, a ranked list of users of the second class identified as having a current status of available, the ranked list of users of the second class displayed on a user interface;
   matching, by the application server, the first user with the ranked list of users of the second user class, an ordering of the ranked list based on:
      a historical user rating of a respective user of the second class from users of the first class, and
      the estimated time of arrival,
      wherein, each of the plurality of users of the second class that did not respond to said querying step are excluded from the ranked list;
   receiving, by the application server, a selection from the first user of the first user class of a second user of the second user class, the second user corresponding to a second mobile device;
   initiating, by the application server, audio telephonic communication between the first and second users respectively via the first mobile device and the second mobile device without sharing contact information between the first and second mobile device, the audio telephonic communication routed through the application server using an in-app calling service, wherein the first mobile device and the second mobile device do not have contact information associated with each other;

determining, by the application server, an end of a showing event based on the periodic determining of the location data of the first mobile device and the periodic triggering of the GPS coordinate checks of the second mobile device indicating each respective mobile device is heading away from the first for-sale property; and in response to said determining the end of the showing event, ceasing, by the application server, the audio telephonic communication between the first and second mobile device.

2. A method for facilitating the selection and showing of for-sale property between a real estate agent and a client comprising:

matching, by an application server, application users belonging to two separate user classes based on location data and orientation data from mobile devices associated with each of the users derived from respective GPS sensors and one or more motion sensors onboard the mobile devices associated with each of the users, the location data indicating that the application users belonging to two separate user classes are within a predetermined proximity and in a direction of a for-sale property;

receiving, by the application server, a notification from a first user of a first user class of the two separate user classes selecting a second user of a second user class of the two separate user classes; and initiating, by the application server, audio telephonic communication between the first and second users respectively via a first mobile device and a second mobile device without sharing contact information between the first and second mobile device, the audio telephonic communication routed through the application server using an in-app calling service, wherein the first mobile device and the second mobile device do not have contact information associated with each other.

3. The method of claim 2, wherein the first class is associated with the client and the second class is associated with the real-estate agent.

4. The method of claim 2, further comprising:
querying, by the application server, the second user for an estimated time of arrival at the for-sale property.

5. The method of claim 4, wherein said querying is performed in response to said matching.

6. The method of claim 4, wherein said querying further comprises:
determining a predicted time of arrival for the second user based on local traffic data; and
prompting the second user with the predicted time of arrival.

7. The method of claim 4, further comprising:
transmitting, by the application server, the estimated time of arrival to the first user.

8. The method of claim 7, wherein said transmitting is performed prior to said receiving a notification.

9. The method of claim 2, wherein said initiating the audio telephonic communication between the first mobile device and the second mobile device further comprises:
delivering, by the application server, in-band communication data between the first mobile device and the second mobile device via the in-app calling service, the in-app calling service installed on each of the first and second mobile devices.

10. The method of claim 2, wherein said initiating the audio telephonic communication between the first mobile device and the second mobile device further comprises:
forwarding, by the application server, communication data between the first mobile device and the second mobile device via native device communication features using device contact information stored on the applications server.

11. The method of claim 2, wherein said matching further comprises:
transmitting, to the first mobile device, a ranked list of users of the second class identified as having a current status of available and, the ranked list of users of the second class browsable via display on a user interface, an ordering of the ranked list based on:
a historical user rating of a respective user of the second class from users of the first class, and
physical distance from the for-sale property as derived from respective GPS sensors; and
receiving a selection of the second user from the first user via the ranked list.

12. The method of claim 2, wherein the predetermined proximity is different for each class of user of the two separate classes of users.

13. The method of claim 2, further comprising:
determining, by the application server, an end of a showing event based on the location data from mobile devices associated with each of the users derived from respective GPS sensors onboard of the first mobile device and the second mobile device indicating each respective mobile device is heading away from the for-sale property.

14. The method of claim 13, further comprising:
in response to said determining the end of the showing event, ceasing enablement, by the application server, of out-of-band telephonic communication between the first and second device; and
in response to said determining the end of the showing event, ceasing notifications, by the application server, of in-band application-based communication between the first and second device.

15. The method of claim 2, further comprising:
combining measurements from the GPS sensors with historic location data of the application users as part of the location data from mobile devices associated with each of the users, wherein the historic location data indicates a number of visits to the for-sale property or an amount of time spent at the for-sale property.

16. A method for facilitating the selection and showing of for-sale property between a real estate agent and a client comprising:
periodically determining, by a client application instanced on a first mobile device, a first stage determination of location data of the first mobile device via GPS coordinates identified via an onboard GPS sensor, and orientation data of the first mobile device identified via one or more onboard motion sensors, and wherein the first mobile device is associated with a first user of a first user class;
calculating a tight area based on a predicted direction of the first user using the location data of the first mobile device and orientation data of the first mobile device, wherein the tight area is further filtered from the first stage determination of location data and orientation data of the first mobile device based on proximal for-sale properties;

determining, by an application server, a list of for-sale property within the calculated tight area based on location data from the first mobile device associated with the first user of a first user class, wherein the location data associated with the first user of the first user class includes the orientation of the first mobile device, and wherein the orientation of the first mobile device is determined by the first user pointing the first mobile device at the for-sale property;

receiving, by the application server, a selection of a first for-sale property from the list of for-sale property, the location data indicating that the first mobile device is within a predetermined proximity of the for-sale property, and wherein the selection of the first for-sale property from the list of for-sale property is determined using the orientation of the first mobile device, wherein the orientation of the first mobile device is an orientation pointed at the first for-sale property;

periodically triggering, by the application server, GPS coordinate checks via GPS sensors on a plurality of mobile devices each corresponding to a respective plurality of users of a second user class, the GPS coordinate checks indicate current locations of the users of the second class relative to the first for-sale property, the plurality of users of the second user class each associated with the plurality of mobile devices each within a second predetermined proximity of the first for-sale property;

querying, by the application server, a subset of the plurality of users of the second user class for a current status and an estimated time of arrival at the first for-sale property, the subset of the plurality of users of the second user class identified based on the GPS coordinate checks of the plurality of mobile devices that correspond to devices within a second predetermined proximity of the first for-sale property, wherein the current status of the subset of the plurality of users of the second class is designated available in response to receipt by the application server of a message from the plurality of mobile devices respectively corresponding to the subset of the plurality of users of the second user class;

transmitting, to the first mobile device, a ranked list of users of the second class identified as having a current status of available, the ranked list of users of the second class displayed on a user interface;

matching, by the application server, the first user with the ranked list of users of the second user class, an ordering of the ranked list based on:
 a historical user rating of a respective user of the second class from users of the first class, and
 physical distance from the for-sale property as derived from respective GPS sensors;

receiving, by the application server, a selection from the first user of the first user class of a second user of the second user class; and initiating, by the application server, audio telephonic communication between the first and second users respectively via the first mobile device and a second mobile device without sharing contact information between the first and second device, the audio telephonic communication routed through the application server using an in-app calling service, wherein the first mobile device and the second mobile device do not have contact information associated with each other.

17. The method of claim 16, wherein said querying further comprises:
 determining a predicted time of arrival for each of the plurality of users of the second user class based on local traffic data; and
 prompting each of the plurality of users of the second user class with respective predicted times of arrival.

18. The method of claim 17, wherein said querying further comprises:
 receiving, by the application server, amendments to the respective predicted times of arrival; and
 updating, by the application server, estimated times of arrival for each respective user of the plurality of users of the second user class based on the amendments to the respective predicted times of arrival.

19. A system for facilitating the selection and showing of for-sale property between a real estate agent and a client comprising:
 a processor; and
 a memory including instructions that when executed cause the processor to:
  match, by an application server, application users belonging to two separate user classes based on location data and orientation data from mobile devices associated with each of the users derived from respective GPS sensors and one or more motion sensors onboard the mobile devices associated with each of the users, the location data indicating that the application users belonging to two separate user classes are within a predetermined proximity and in a direction of a for-sale property;
  receive, by the application server, a notification from a first user of a first user class of the two separate user classes selecting a second user of a second user class of the two separate user classes; and
  initiate audio telephonic communication between the first and second users respectively via a first mobile device and a second mobile device without sharing contact information between the first and second mobile device, the audio telephonic communication routed through the application server using an in-app calling service, wherein the first mobile device and the second mobile device do not have contact information associated with each other.

20. The system of claim 19, wherein the instructions further cause the processor to:
 forward, by the application server, out-of-band communication data between the first mobile device and the second mobile device via native device communication features using device contact information stored on the applications server.

21. The system of claim 19, wherein said instruction to match further comprises:
 transmitting, to the first mobile device, a ranked list of users of the second class identified as having a current status of available and, the ranked list of users of the second class browsable via display on a user interface, an ordering of the ranked list based on:
  a historical user rating of a respective user of the second class from users of the first class, and
  physical distance from the for-sale property as derived from respective GPS sensors; and receiving a selection of the second user from the first user via the ranked list.

\* \* \* \* \*